US012424105B2

(12) United States Patent
Amma et al.

(10) Patent No.: US 12,424,105 B2
(45) Date of Patent: Sep. 23, 2025

(54) INFORMATION PROCESSING METHOD, INFORMATION PROCESSING SYSTEM, AND CONTROL PROGRAM

(71) Applicants: YAMAHA HATSUDOKI KABUSHIKI KAISHA, Iwata (JP); MICWARE CO., LTD., Kobe (JP)

(72) Inventors: Hirofumi Amma, Shizuoka (JP); Hidenori Satake, Shizuoka (JP); Yukitaka Okamoto, Shizuoka (JP); Hideyoshi Sato, Shizuoka (JP); Masaya Fujiyoshi, Hyogo (JP); Seiichi Kataoka, Hyogo (JP)

(73) Assignees: YAMAHA HATSUDOKI KABUSHIKI KAISHA, Shizuoka (JP); MICWARE CO., LTD., Hyogo (JP)

( * ) Notice: Subject to any disclaimer, the term of this patent is extended or adjusted under 35 U.S.C. 154(b) by 246 days.

(21) Appl. No.: 18/126,791

(22) Filed: Mar. 27, 2023

(65) Prior Publication Data

US 2023/0316928 A1 Oct. 5, 2023

(30) Foreign Application Priority Data

Mar. 30, 2022 (JP) ................................ 2022-056487

(51) Int. Cl.
*G08G 3/00* (2006.01)

(52) U.S. Cl.
CPC ..................................... *G08G 3/00* (2013.01)

(58) Field of Classification Search
CPC .......... G08G 3/00; B63B 49/00; G01C 21/20; G01C 21/203
USPC .......................................................... 701/117
See application file for complete search history.

(56) References Cited

U.S. PATENT DOCUMENTS

2015/0186413 A1* 7/2015 Zhu ..................... H04L 67/1097 707/751
2018/0283874 A1* 10/2018 Hashizume .......... G09B 29/007
2020/0089694 A1* 3/2020 Cabra ..................... G06T 17/05
2023/0204362 A1* 6/2023 Tulgara ................... G01S 15/89 701/431

FOREIGN PATENT DOCUMENTS

JP 2018-165142 A 10/2018

* cited by examiner

*Primary Examiner* — Anshul Sood
(74) *Attorney, Agent, or Firm* — Keating & Bennett, LLP

(57) ABSTRACT

An information processing method includes displaying a water-based map on a display unit, accepting an operation by an administrator, storing a selected tile by the administrator in a storage unit as a particular tile from among a plurality of tiles resulting from division of an area on the water-based map into a mesh pattern, detecting a present location of a ship at a predetermined time interval, and notifying an alert when the ship enters a water area corresponding to the particular tile.

7 Claims, 21 Drawing Sheets

INFORMATION PROCESSING METHOD, INFORMATION PROCESSING SYSTEM, AND CONTROL PROGRAM

CROSS REFERENCE TO RELATED APPLICATIONS

This application claims the benefit of priority to Japanese Patent Application No. 2022-056487 filed on Mar. 30, 2022. The entire contents of this application are hereby incorporated herein by reference.

BACKGROUND OF THE INVENTION

1. Field of the Invention

The present invention relates to an information processing method, an information processing system, and a control program.

2. Description of Related Art

Japanese Patent Application Publication No. 2018-165142 discloses a navigation assist system configured to issue alerts and/or alarms properly in response to actual sailing circumstances of a small ship in a predetermined water region when the subject ship approaches a dangerous region. This navigation assist system includes a danger level data update/storage unit that acquires a position where the ship is trimmed up as trim-up positional information, and updates and stores a danger level by determining a danger level of each coordinate region on the basis of the trim-up positional information.

According to the navigation assist system disclosed in Japanese Patent Application Publication No. 2018-165142, in order to determine a coordinate region as a target of issuance of an alert or an alarm, the ship is required to actually pass through such a water region. Thus, sufficient action has yet to be taken for a water region that the ship has not actually passed through.

SUMMARY OF THE INVENTION

Preferred embodiments of the present invention provide information processing methods, information processing systems, and non-transitory computer-readable media including control programs each able to determine a water region that requires issuance of an alert or an alarm before a ship has actually passed through the water region, and to issue the alert or alarm to the ship.

An information processing method according to a first preferred embodiment of the present invention includes displaying a water-based map on a display unit, accepting selection of a tile in which the water-based map displayed on the display unit includes a plurality of tiles that divide an area on the map into a mesh pattern, storing the selected tile in a storage unit as a particular tile, detecting a present location of a ship at a predetermined time interval, and notifying an alert when the ship enters a water area corresponding to the particular tile.

The information processing method described above makes it possible to determine a water area that requires the issuance of an alert even though the ship has not actually passed through the water area, and to issue the alert to the ship.

In the information processing method described above, the particular tile is in a designated area on the map. This configuration makes it possible to efficiently set the particular tile.

Preferably, in the information processing method described above, adjacent ones of meshes in the mesh pattern corresponding to the plurality of tiles are spaced part from each other at a distance of equal to or greater than about 20 m and equal to or less than about 40 m. This increases the accuracy of the alert, and a reduces a processing load.

In the information processing method described above, a mesh width that corresponds to an area of the tile is able to be stepwise changed, and the particular tile of a predetermined mesh width is stored in the storage unit.

Preferably, the information processing method described above further includes acquiring tile information as information about the particular tile. The particular tile information is particular tile information within a predetermined range determined in response to the detected present location of the ship. This makes it possible to acquire the particular tile information of an optimum size to reduce a processing load on an information processor and reduce the storage capacity of the information processor.

An information processing system according to a second preferred embodiment of the present invention includes a server and an information processor. The server manages a tile to identify a water area requiring caution during traveling of a ship as a particular tile. The tile belongs to an area resulting from division of an area on a map into a mesh pattern. The information processor is mounted on the ship. The server is configured or programmed to function as a first storage unit, a display generation unit, and a tile setting unit. The display generation unit is operable to generate the map based on water to be displayed on a display unit. The tile setting unit stores the tile in the first storage unit as the particular tile. The stored tile is selected by an administrator on the map displayed on the display unit via an accepting unit that accepts an operation by the administrator. The information processor includes a present location detector, a tile information acquisition unit, a second storage unit, and a notification unit. The present location detector detects a present location of the ship at a predetermined time interval. The tile information acquisition unit is operable to acquire particular tile information. The particular tile information is information about the particular tile. The second storage unit is operable to store the acquired particular tile information. The notification unit issues an alert when the ship enters a water area corresponding to the particular tile.

The information processing system described above makes it possible to determine a water area that requires issuance of an alert before the ship has passed through the water area, and to issue an alert correctly to the ship.

Preferably, in the information processing system described above, the information processor includes a recording medium to store the particular tile information acquired from the server and mountable on and removable from the information processor. The tile information acquisition unit is operation to acquire the particular tile information from the recording medium and to store the acquired particular tile information in the second storage unit. This reduces the storage capacity of the second storage unit.

An information processor according to a third preferred embodiment of the present invention includes a display generation unit and a tile setting unit. The display generation unit is operable to generate a water-based map to be displayed on a display unit. The tile setting unit is operable to store a tile selected by an administrator in a storage unit as a particular tile on the map displayed on the display unit. The selection by the administrator is made via an accepting unit that accepts operation by the administrator. The tile corresponds to an area resulting from division of an area on the map into a mesh pattern. Particular tile information is used to issue an alert when a ship enters a water area corresponding to the particular tile. The particular tile information is information about the particular tile.

A non-transitory computer-readable medium including a control program according to a fourth preferred embodiment of the present invention causes a computer including a storage unit to function as a display generation unit and a tile setting unit. The display generation unit is operable to generate a water-based map to be displayed on a display unit. The tile setting unit stores a tile selected by an administrator in the storage unit as a particular tile on the map displayed on the display unit. The selection by the administrator is made via an accepting unit that accepts an operation by the administrator. The tile belongs to an area resulting from division of an area on the map into a mesh pattern. Particular tile information is used to issue an alert when a ship enters a water area corresponding to the particular tile. The particular tile information is information about the particular tile.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
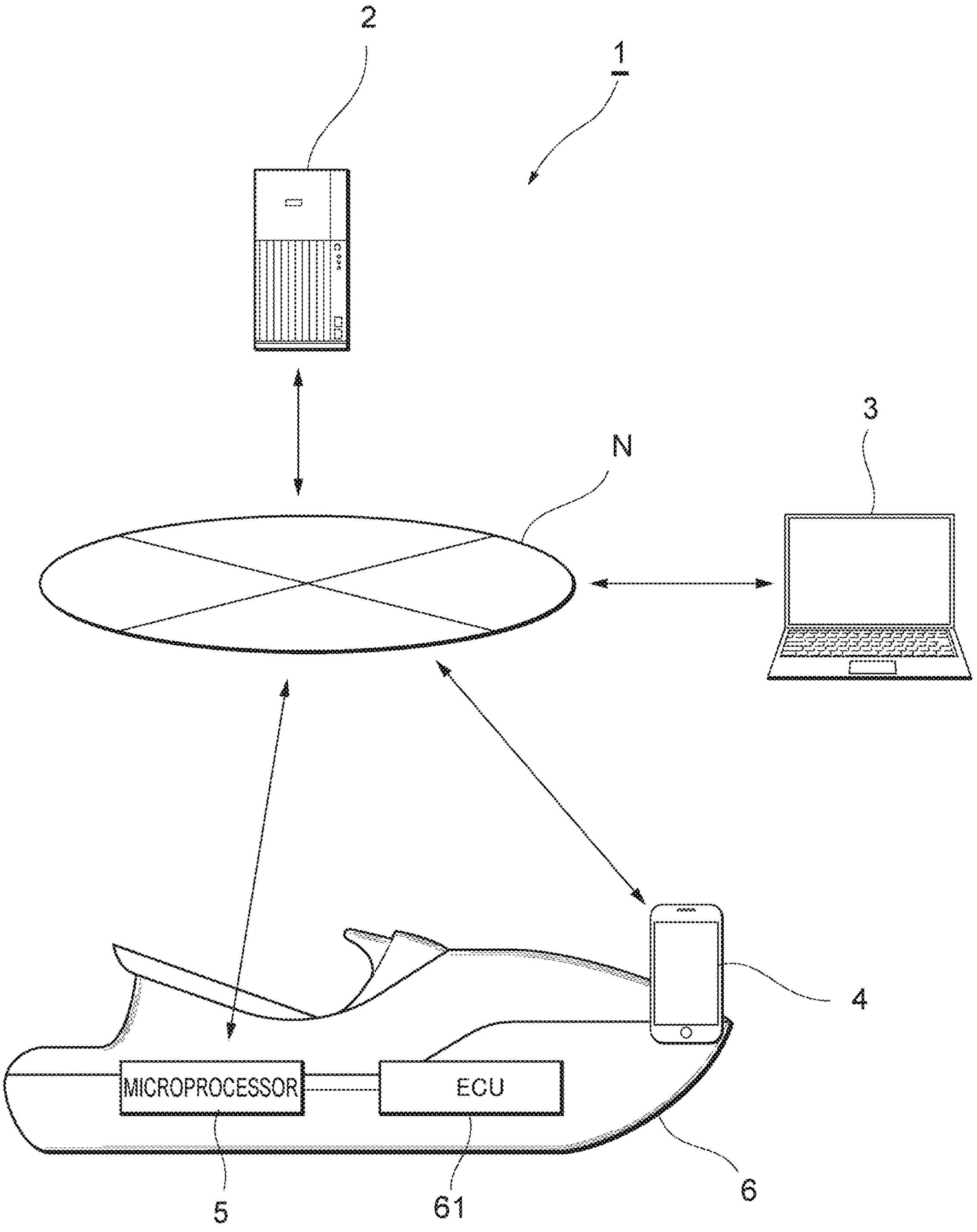
FIG. 1 shows a configuration of an information processing system according to a first preferred embodiment of the present invention.

Preferred embodiments of the present invention will be described below by referring to the drawings. Structures in common between the preferred embodiments described below will be given a single reference character and description thereof overlapping the preferred embodiments will be omitted.

First Preferred Embodiment

An information processing system 1 according to a first preferred embodiment of the present invention issues an alert when a ship 6 traveling on water enters a prohibited area where entry is prohibited, or when the ship 6 travels at a speed equal to or higher than a predetermined speed in a slowdown area where speed reduction is required. In other words, the information processing system 1 issues an alert when a ship enters a water area requiring the ship to take caution in sailing, for example. In a preferred embodiment of the present invention, the prohibited area and the slowdown area are collectively referred to as a particular area. The prohibited area and the slowdown area are examples of an area requiring the issuance of an alert to a ship. In another configuration, an alert may be issued in an area other than these areas. For example, an area requiring issuance of an alert to a ship may be an audio-restricted area where the volume of audio sounds such as music output from a speaker mounted on the ship is restricted.

As shown in FIG. 1, the information processing system 1 according to the first preferred embodiment of the present invention includes a server 2, a PC terminal 3, a mobile terminal 4, a microprocessor 5, and an engine control unit (ECU) 61. The ECU 61 is mounted on the ship 6, detects the number of rotations of an engine of the ship 6, and outputs the detected number to the microprocessor 5. The ECU 61 may output the speed of the ship 6 instead of the number of rotations of the engine. The server 2, the PC terminal 3, the mobile terminal 4, and the microprocessor 5 are communicably connected to each other in a wired or wireless manner through a network N. Each of the structures of the information processing system 1 may include two or more of such structures.

The PC terminal 3 is, for example, a personal computer (PC). The PC terminal 3 may be a smartphone, a tablet, a mobile phone, a laptop PC, or a wearable computer.

The mobile terminal 4 is, for example, a mobile terminal mounted on the ship 6. The mobile terminal 4 may be held by a person on board the ship 6. The mobile terminal 4 may be an information processing device such as a PC, a tablet, a mobile phone, a laptop PC, or a wearable computer, and is typically a smartphone.

The microprocessor 5 is an information processing device including a semiconductor device or a combination of the semiconductor device and an electronic component mounted on a substrate provided in the ship 6. The microprocessor 5 is realized by hardware, firmware, or software, or a combination thereof.

Figure 2:
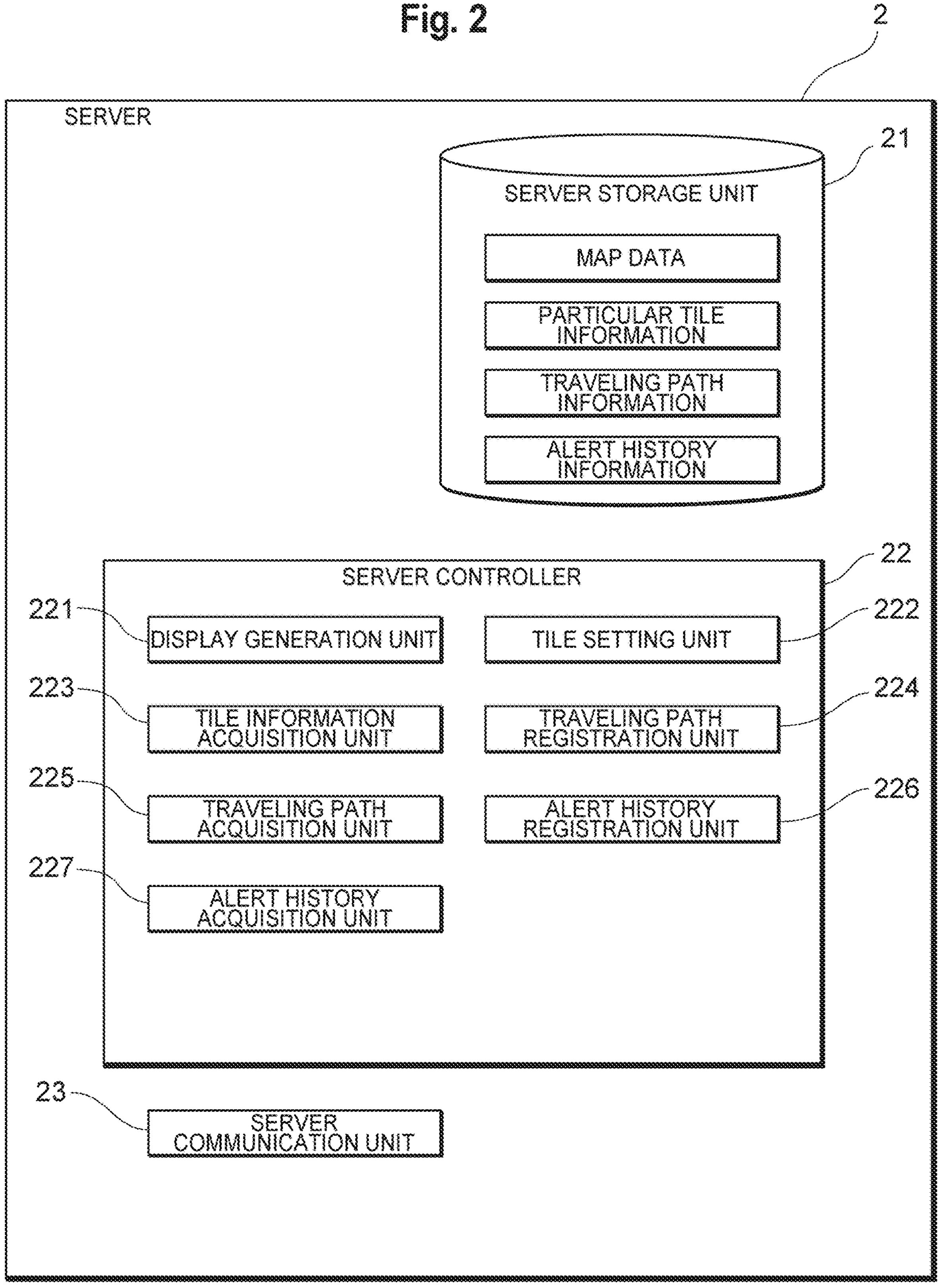
FIG. 2 shows a configuration of a server.

As shown in FIG. 2, the server 2 includes a server storage unit 21, a server controller 22, and a server communication unit 23. The server 2 manages a particular tile, which is a tile corresponding to a particular area. The server 2 may be a computer with a storage unit.

A tile refers to each of areas resulting from division of an area on a map into a mesh pattern, namely, into a grid pattern. Specifically, the tile is defined by the mesh. The tile is identified by a zoom level and a tile coordinate, for example. The zoom level is expressed by a numeric character indicating a display magnification of the map. Incrementing the zoom level by 1 multiplies the display magnification of the map by 4 to reduce each of the length and breadth of an actual area corresponding to the tile by half. At a zoom level 0, a map of the globe projected by a certain map projection system is entirely expressed in one square tile. The certain map projection system is a method of making a conversion using a mathematical formula according to Mercator projection on a range without a partial area in a polar region excluded for converting longitudes and latitudes in the world geodetic system into a square. With an eastward direction defined as an X positive direction and a southward direction defined as a Y positive direction, tile coordinates are expressed in a manner "X, Y." Information about the particular tile is called particular tile information. Information indicating the tile can be determined freely within a range not causing inconsistency in terms of attaining the purpose of the present invention. The information indicating the tile is convertible to information about the latitude and longitude of this tile through certain calculations.

A particular tile managed as the particular tile by the server 2 is a tile corresponding to the particular area as a collective term for the prohibited area and the slowdown area. The prohibited area refers to a water area where entry of a ship is prohibited. The slowdown area refers to a water area where the ship is required to travel at a speed equal to or lower than a predetermined speed, namely, is required not to travel at an excessive speed. In other words, the particular area is a water area requiring caution during traveling of the ship.

The server storage unit 21 is realized by a storage device. This storage device may be a random access memory (RAM), a semiconductor memory element such as a flash memory, a magnetic disk, or an optical disk, for example.

The server storage unit 21 stores map data, particular tile information, traveling path information, and alert history information. The server storage unit 21 further stores a program to fulfill a predetermined function by being executed by the server controller 22, and other types of data. The map data contains data about a map of a water area where the ship 6 travels. The traveling path information and the alert history information will be described below.

The server controller 22 is realized by a central processing unit (CPU) or a micro processing unit (MPU), for example. This CPU or MPU executes various types of programs stored in the server storage unit 21 to function as a display generation unit 221, a tile setting unit 222, a tile information acquisition unit 223, a traveling path registration unit 224, a traveling path acquisition unit 225, an alert history registration unit 226, and an alert history acquisition unit 227 of the server controller 22 corresponding to their respective programs.

The display generation unit 221 generates an image to be displayed on a PC display unit 34 of the PC terminal 3 or on a mobile display unit 44 of the mobile terminal 4. This image may include a map, an operation menu, an icon, etc. While this map includes a water-based map, it may not include a land-based map. In the information processing system 1 of the present preferred embodiment, the display generation unit 221 of the server 2 generates an image to be displayed on the PC display unit 34. Alternatively, the server 2 may transmit data to be used to draw a map and a tile to the PC terminal 3 and the PC terminal 3 may generate an image to be displayed on the PC display unit 34. Likewise, while the display generation unit 221 of the server 2 generates an image to be displayed on the mobile display unit 44, the mobile terminal 4 may generate an image to be displayed on the mobile display unit 44. In addition to such display functions, subjects to fulfill the respective functions in the server 2 may be replaced with those in the PC terminal 3 or in the mobile terminal 4.

The tile setting unit 222 stores a tile, selected by an administrator responsible for management such as setting of a particular area via a PC input unit 35 of the PC terminal 3, as a particular tile corresponding to a particular area in the server storage unit 21. At this time, the tile setting unit 222 determines the tile selected by the administrator based on information about an operation by the administrator received from a PC accepting unit 322. The server storage unit 21 stores information about each tile indicating whether a water area corresponding to the tile is the prohibited area, the slowdown area, or a normal area. The normal area is an area that is neither the prohibited area nor the slowdown area. In another case, the server storage unit 21 may store a tile corresponding to each of the prohibited area and the slowdown area to make a tile corresponding to the normal area recognizable.

The tile information acquisition unit 223 acquires required particular tile information from the server storage unit 21. The particular tile information is information about a particular tile. More specifically, the tile information acquisition unit 223 acquires the particular tile information from the server storage unit 21 in response to a request from another device, and transmits the acquired particular tile information using the server communication unit 23 to the device having requested the particular tile information. The tile information acquisition unit 223 acquires the particular tile information from the server storage unit 21 to display the particular tile in addition to a map on a display unit of another device.

The traveling path registration unit 224 stores traveling path information in the server storage unit 21 having been received from the mobile terminal 4 or the microprocessor 5 and indicating a traveling path that is a path along which the ship 6 has traveled. The traveling path information contains positional information about a latitude and a longitude and time showing the path along which the ship 6 has traveled. The traveling path information is stored in association with the ship 6 as a target. The positional information in the traveling path information may indicate a latitude and a longitude using absolute values or may indicate a position using relative coordinates based on a predetermined position, for example. The positional information in the traveling path information may be indicated using information about a difference from positional information immediately before.

The traveling path acquisition unit 225 acquires traveling path information from the server storage unit 21. The traveling path acquisition unit 225 can acquire the traveling path information from the server storage unit 21 in response to a request from another device, and transmit the acquired traveling path information using the server communication unit 23 to the device having requested the traveling path information. The traveling path acquisition unit 225 generates an image to display a traveling path via the display generation unit 221 based on the acquired traveling path information.

The alert history registration unit 226 stores alert history information in the server storage unit 21 having been received from the mobile terminal 4 or the microprocessor 5 and indicating an alert history that is a history of issuance of an alert. The alert history information indicates positional information about a location where and a time when an alert in response to entry into the prohibited area and traveling at an excessive speed in the slowdown area is issued. This positional information is information about a latitude and a longitude, for example. The alert history information is stored in association with the ship 6 having been targeted for issuance of the alert. The alert history information and the traveling path information may be stored in association with each other. In this case, the positional information indicated in the alert history information is part of the positional information indicated in the traveling path information. For this reason, the alert history information may be associated with the traveling path information and stored in a data format such as a flag indicating issuance of the alert.

The alert history acquisition unit 227 acquires alert history information from the server storage unit 21. The alert history acquisition unit 227 can acquire the alert history information from the server storage unit 21 in response to a request from another device, and transmit the acquired alert history information using the server communication unit 23 to the device having requested the alert history information. The alert history acquisition unit 227 generates an image to display an alert history via the display generation unit 221 based on the acquired alert history information.

The server communication unit 23 is realized, for example, by a network interface card (NIC), etc. The server communication unit 23 is connected to the network N in a wired or wireless manner. The server communication unit 23 transmits and receives data to and from another device.

Figure 3:
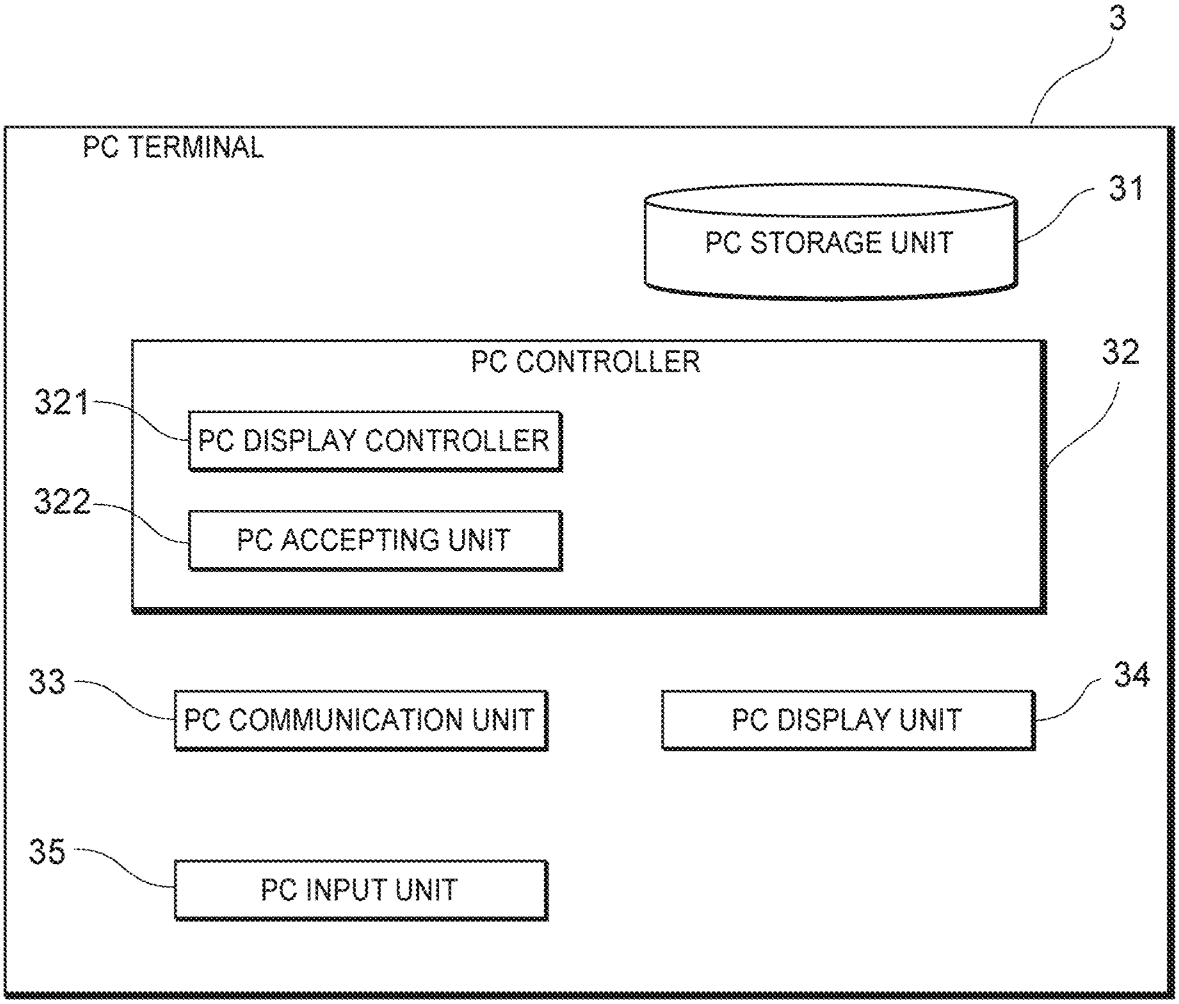
FIG. 3 shows a configuration of a PC terminal.

As shown in FIG. 3, the PC terminal 3 includes a PC storage unit 31, a PC controller 32, a PC communication unit 33, the PC display unit 34, and the PC input unit 35. While the PC terminal 3 of the present preferred embodiment may be a PC, it simply functions mainly as a display device and an input device and the server 2 is responsible for data processing. Instead of this configuration, the PC terminal 3 may take the place of the server 2 to process data, etc. In this case, the PC controller 32 may provide at least some of the functions of the server controller 22 of the server 2.

The PC storage unit 31 is realized by a storage device. This storage device may be a RAM, a semiconductor memory element such as a flash memory, a magnetic disk, or an optical disk, for example. The PC storage unit 31 stores a program to fulfill a predetermined function by being executed by the PC terminal 3, and other types of data.

The PC controller 32 is realized by a CPU or an MPU, for example. This CPU or MPU executes various types of programs stored in the PC storage unit 31 to function as a PC display controller 321 and the PC accepting unit 322 corresponding to their respective programs.

The PC display controller 321 controls an image to be displayed on the PC display unit 34. The PC display controller 321 displays an image on the PC display unit 34 having been received from the server 2 and generated by the display generation unit 221. The PC display controller 321 may generate an image to be displayed on the PC display unit 34.

The PC accepting unit 322 accepts an operation performed by an administrator via the PC input unit 35. In response to the operation by the administrator accepted by the PC accepting unit 322, the PC controller 32 performs various types of processes. The PC controller 32 can transmit information about a certain operation by the administrator accepted by the PC accepting unit 322 to the server 2 via the PC communication unit 33. In performing a particular tile setting process, the PC accepting unit 322 transmits information about a position on the PC display unit 34 clicked by the administrator to the tile setting unit 222 of the server 2. The server 2 can identify a tile selected by the administrator based on this information.

The PC communication unit 33 is realized, for example, by an NIC, etc. The PC communication unit 33 is connected to the network N in a wired or wireless manner. The PC communication unit 33 transmits and receives data to and from another device.

The PC display unit 34 includes two or more pixels and displays an image. The PC display unit 34 is realized, for example, by a liquid crystal display or an organic EL display, etc. A touch panel may be used as the PC display unit 34. In this case, the PC display unit 34 and the PC input unit 35 are integrated with each other. The PC display unit 34 displays a map to set a particular tile or a map to display and check a particular tile, for example.

The PC input unit 35 is an input device to accept various types of operations by an administrator. The PC input unit 35 is realized, for example, by a keyboard, a mouse, or a touch panel, etc.

Figure 4:
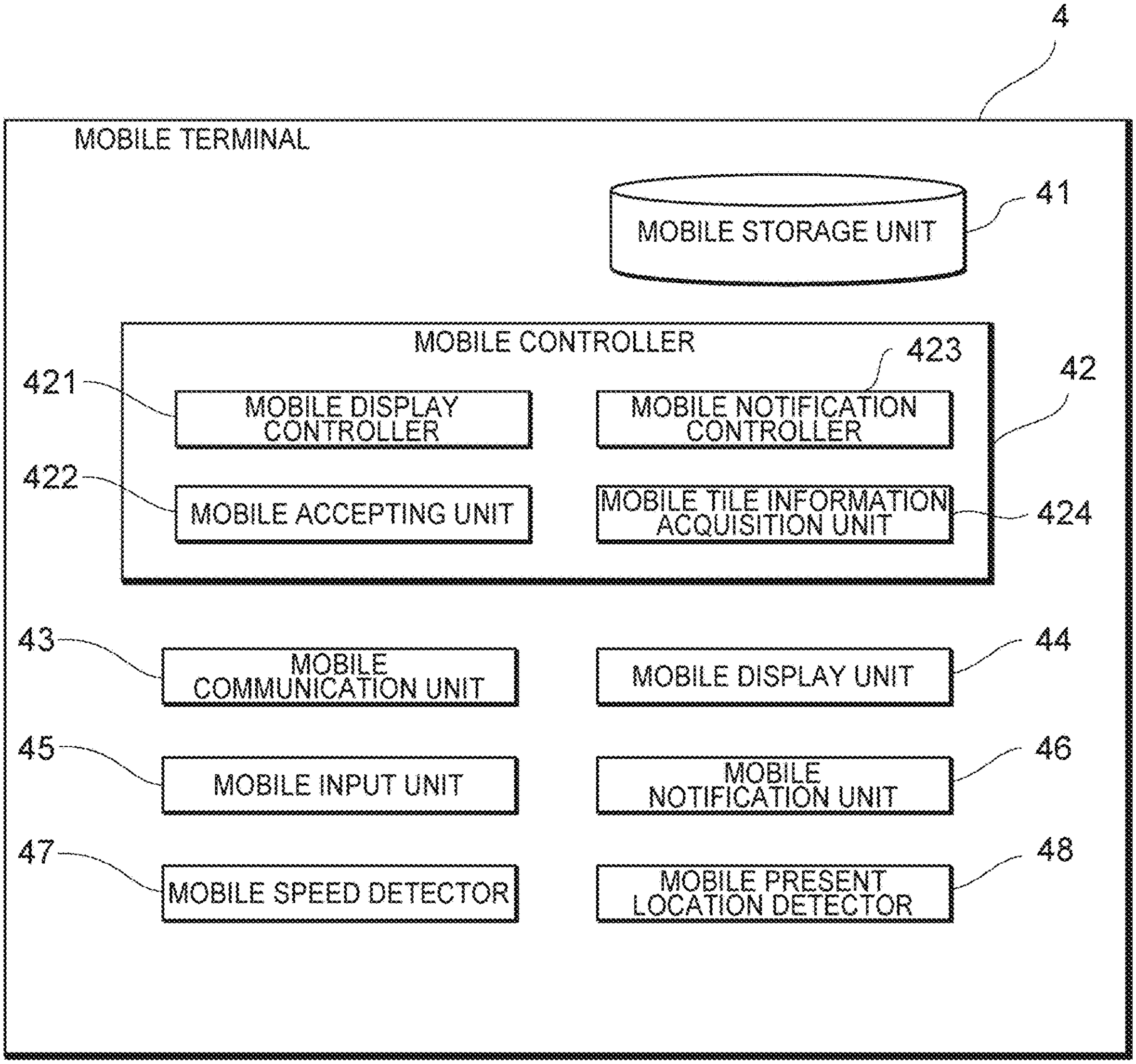
FIG. 4 shows a configuration of a mobile terminal.

As shown in FIG. 4, the mobile terminal 4 includes a mobile storage unit 41, a mobile controller 42, a mobile communication unit 43, the mobile display unit 44, a mobile input unit 45, a mobile notification unit 46, a mobile speed detector 47, and a mobile present location detector 48. The mobile storage unit 41, the mobile controller 42, the mobile communication unit 43, the mobile display unit 44, and the mobile input unit 45 of the mobile terminal 4 have functions similar to those of the PC storage unit 31, the PC controller 32, the PC communication unit 33, the PC display unit 34, and the PC input unit 35 of the PC terminal 3, respectively. For this reason, the following description is mainly intended for a different function of each structure of the mobile terminal 4 and description of the same function of the structure will be omitted.

The mobile storage unit 41 stores a program to be executed in the mobile terminal 4, and additionally, stores information about a particular tile received from the server 2.

The mobile controller 42 executes various types of programs stored in the mobile storage unit 41 to function as a mobile display controller 421, a mobile accepting unit 422, a mobile notification controller 423, and a mobile tile information acquisition unit 424.

The mobile display controller 421 controls an image to be displayed on the mobile display unit 44. While the mobile display controller 421 may display an image on the PC display unit 34 generated by the display generation unit 221 of the server 2, it may generate an image to be displayed on the mobile display unit 44. In this case, the image to be displayed on the mobile display unit 44 may be generated based on map data, etc. acquired from the server 2 or map data, etc. stored in the mobile storage unit 41.

The mobile notification controller 423 controls the mobile notification unit 46 to issue an alert when the ship 6 enters a water area corresponding to a particular tile.

More specifically, the mobile notification controller 423 determines that the ship 6 has entered a water area corresponding to a particular tile by comparing a detected present location with particular tile information stored in the mobile storage unit 41. This present location is detected by the mobile present location detector 48. Alternatively, a present location detected by a microprocessor present location detector 58 may be used. At this time, the mobile notification controller 423 converts the particular tile information to information about a latitude and a longitude or converts present location information to information indicating a tile through certain calculations, and compares the particular tile information and the present location information with each other. In the case of entry of the ship 6 into a water area corresponding to the prohibited area, the mobile notification controller 423 issues an alert by outputting an alert sound via the mobile notification unit 46. In the case of entry of the ship 6 into a water area corresponding to the slowdown area, the mobile notification controller 423 issues an alert by outputting an alert sound via the mobile notification unit 46 if the speed of the ship 6 detected by the mobile speed detector 47 is equal to or higher than a predetermined speed such as 10 km/h, for example. The alert sound differs between the case of entry of the ship 6 into the prohibited area and the case of traveling of the ship 6 in the slowdown area at a speed equal to or higher than the predetermined speed. In addition to using sound output from the mobile notification unit 46, the mobile notification controller 423 may further issue an alert using an image via the mobile display unit 44. Alternatively, the mobile notification controller 423 may issue an alert using an image via the mobile display unit 44 instead of using sound. Still alternatively, the mobile notification controller 423 may issue an alert using sound via a microprocessor notification unit 56 of the microprocessor 5.

The mobile tile information acquisition unit 424 determines a range of acquisition of particular tile information in response to a present location detected by the mobile present location detector 48. For example, the mobile tile information acquisition unit 424 acquires particular tile information within a range with a circumference of, for example, about 10 km from a present location. The range of acquisition of particular tile information is not limited to the range with a circumference of about 10 km but may be a range with a circumference of about 20 km, with a circumference of about 5 km, or with a circumference of about 1 km, for example. For example, if a present location is in the vicinity of Tokyo Bay, the mobile tile information acquisition unit 424 may acquire particular tile information about a place around Tokyo Bay. If a present location is in the vicinity of Sagami Bay, the mobile tile information acquisition unit 424 may acquire particular tile information about a place around Sagami Bay.

The mobile tile information acquisition unit 424 acquires particular tile information from the server storage unit 21 of the server 2 via the mobile communication unit 43, and stores the acquired particular tile information in the mobile storage unit 41. Timing of acquisition of the particular tile information by the mobile tile information acquisition unit 424 can be determined freely. The mobile tile information acquisition unit 424 acquires the particular tile information in conformity with a timing of when the mobile present location detector 48 acquires information about a present location, in conformity with a timing of when movement by a predetermined distance or more occurs from previous acquisition of particular tile information, at a predetermined time interval, or in conformity with timing of when the engine of the ship 6 is started.

The mobile communication unit 43 transmits traveling path information indicating a traveling path of the ship 6 and alert history information indicating a history of issuance of an alert to the server 2. The traveling path information transmitted by the mobile communication unit 43 is information including a combination of information about a present location detected by the mobile present location detector 48 and information about a time of acquisition of the information about the present location. The alert history information transmitted by the mobile communication unit 43 is information including a combination of information about a present location where the mobile notification unit 46 issued an alert, information about time of issuance of the alert, and information indicating a type of the alert.

The mobile notification unit 46 issues an alert by outputting an alert sound under the control of the mobile notification controller 423. The mobile notification unit 46 is realized by a speaker to output a voice, etc.

The mobile speed detector 47 detects the speed of the ship 6. The mobile speed detector 47 detects the speed of the ship 6 based on a present location detected by the mobile present location detector 48. The mobile speed detector 47 may detect the speed of the ship 6 by acquiring the number of rotations of the engine of the ship 6 from the ECU 61 via a microprocessor communication unit 53 of the microprocessor 5. The mobile speed detector 47 may detect the speed by a different method such as detecting the speed using an angular velocity sensor of the mobile terminal 4, etc.

The mobile present location detector 48 detects the present location of the ship 6. For example, the mobile present location detector 48 acquires information about the present location by receiving a radio wave from a global positioning system (GPS) satellite using a GPS sensor. The present location is expressed by a latitude and a longitude, for example. In addition to using the information about the present location acquired by the GPS sensor, the mobile present location detector 48 may detect the present location using information about a base station connected to the mobile terminal 4 for communication, for example. The mobile present location detector 48 may detect the present location by a different method.

At the mobile terminal 4, what is displayed on the mobile display unit 44 can be a map and a particular area covering an optional point, and not a map and a particular area around a present location. In this case, while the mobile terminal 4 displays a map and an image of a particular area on the mobile display unit 44 having been generated by the display generation unit 221 of the server 2 covering a point designated by an administrator, particular tile information about a place around the present location is retained without being deleted. By doing so, even when the mobile terminal 4 displays the map, etc. covering the optional point, an alert can still be issued in response to entry of the ship 6 into the particular area.

Instead of the above-described configuration, the mobile terminal 4 may take the place of the server 2 to process various types of data, etc. In this case, the mobile controller 42 may have at least some of the functions of the server controller 22 of the server 2.

As described above, the microprocessor 5 may be a semiconductor device, for example, mounted on a substrate provided in the ship 6. Thus, compared to the PC terminal 3 and the mobile terminal 4, the microprocessor 5 has a low information processing capability and a small storage capacity. For this reason, compared to the PC terminal 3 and the mobile terminal 4, the microprocessor 5 is responsible for a process to result in a small amount of information processing and a small volume of data to be stored in a microprocessor main memory 59.

Figure 5:
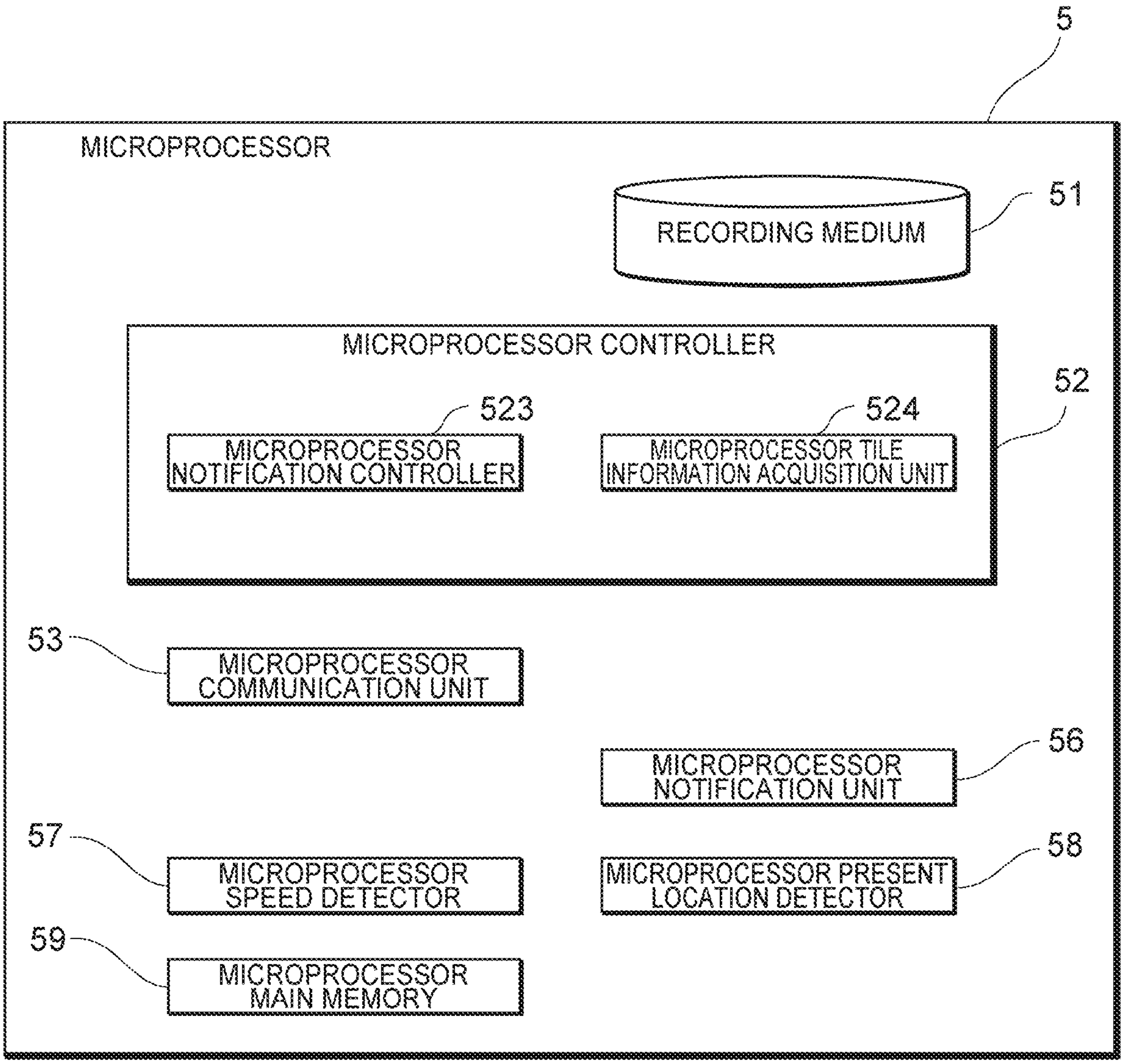
FIG. 5 shows a configuration of a microprocessor.

As shown in FIG. 5, the microprocessor 5 includes a recording medium 51, a microprocessor controller 52, the microprocessor communication unit 53, the microprocessor notification unit 56, a microprocessor speed detector 57, the microprocessor present location detector 58, and the microprocessor main memory 59. The microprocessor controller 52 and the microprocessor communication unit 53 of the microprocessor 5 have functions similar to those of the PC controller 32 and the PC communication unit 33 of the PC terminal 3, respectively. The microprocessor notification unit 56 has a function similar to that of the mobile notification unit 46 of the mobile terminal 4. For this reason, the following description is mainly intended for a different function of each structure and description of the same function of the structure will be omitted.

The recording medium 51 is mountable on and removable from the microprocessor 5. The recording medium 51 is realized by a storage medium. While the recording medium 51 may be a semiconductor memory such as an SD card, it may alternatively be an optical disk or a magnetic disk, etc. The recording medium 51 stores particular tile information acquired in advance from the PC terminal 3. The recording medium 51 acquires the particular tile information from the PC terminal 3 not through communication but by being removed from the microprocessor 5 and actually connected to the PC terminal 3. However, this does not eliminate a case where the recording medium 51 acquires the particular tile information from the PC terminal 3 through communication. The recording medium 51 may store a program to be executed by the microprocessor controller 52.

The microprocessor controller 52 executes various types of programs stored in a storage not shown in the drawings or in the recording medium 51 to function as a microprocessor notification controller 523 and a microprocessor tile information acquisition unit 524. The microprocessor notification controller 523 and the microprocessor tile information acquisition unit 524 may be realized by hardware or firmware of the microprocessor 5, for example.

The microprocessor notification controller 523 controls the microprocessor notification unit 56 to issue an alert when the ship 6 enters a water area corresponding to a particular tile.

More specifically, the microprocessor notification controller 523 determines that the ship 6 has entered a water area corresponding to a particular tile by comparing a detected present location with particular tile information stored in the microprocessor main memory 59. This present location is detected by the microprocessor present location detector 58. Alternatively, a present location detected by the mobile present location detector 48 may be used. At this time, the microprocessor notification controller 523 converts the particular tile information to information about a latitude and a longitude or converts present location information to information indicating a tile through certain calculations, and compares the particular tile information and the present location information with each other. In the case of entry of the ship 6 into a water area corresponding to the prohibited area, the microprocessor notification controller 523 issues an alert by outputting an alert sound via the microprocessor notification unit 56. In the case of entry of the ship 6 into a water area corresponding to the slowdown area, the microprocessor notification controller 523 issues an alert by outputting an alert sound via the microprocessor notification unit 56 if the speed of the ship 6 detected by the microprocessor speed detector 57 is equal to or higher than a predetermined speed such as about 10 km/h, for example. The alert sound differs between the case of entry of the ship 6 into the prohibited area and the case of traveling of the ship 6 in the slowdown area at a speed equal to or higher than the predetermined speed.

The microprocessor tile information acquisition unit 524 determines a range of acquisition of particular tile information in response to a present location detected by the microprocessor present location detector 58. For example, the microprocessor tile information acquisition unit 524 acquires particular tile information within a range with a circumference of about 10 km from a present location. The range of acquisition of particular tile information is not limited to the range with a circumference of about 10 km but may be a range with a circumference of about 20 km, with a circumference of about 5 km, or with a circumference of about 1 km, for example. For example, if a present location is in Tokyo Bay, the microprocessor tile information acquisition unit 524 may acquire particular tile information about a place in Tokyo Bay. If a present location is in Sagami Bay, the microprocessor tile information acquisition unit 524 may acquire particular tile information about a place in Sagami Bay. In another case, if a present location is in Tokyo Bay or in the vicinity of Tokyo Bay, the microprocessor tile information acquisition unit 524 may acquire particular tile information about places in Tokyo Bay and around Tokyo Bay. If a present location is in Sagami Bay or in the vicinity of Sagami Bay, the microprocessor tile information acquisition unit 524 may acquire particular tile information about places in Sagami Bay and around Sagami Bay. A range of acquisition of particular tile information by the microprocessor tile information acquisition unit 524 is preferably narrower than a range of acquisition of particular tile information by the mobile tile information acquisition unit 424.

The microprocessor tile information acquisition unit 524 acquires particular tile information from the recording medium 51 and stores the acquired particular tile information in the microprocessor main memory 59. The timing of acquisition of the particular tile information by the microprocessor tile information acquisition unit 524 can be determined freely. The microprocessor tile information acquisition unit 524 acquires the particular tile information in conformity with a timing of when the engine of the ship 6 is started, for example. The microprocessor tile information acquisition unit 524 may acquire the particular tile information in conformity with a timing of when the microprocessor present location detector 58 acquires information about a present location or at a predetermined time interval. To reduce the amount of information processing by the microprocessor 5, however, the microprocessor tile information acquisition unit 524 preferably acquires particular tile information at a frequency lower than a frequency of acquisition by the mobile tile information acquisition unit 424 in the mobile terminal 4.

The microprocessor communication unit 53 transmits alert history information to the server 2. The alert history information transmitted by the microprocessor communication unit 53 is information including a combination of information about a present location where the microprocessor notification unit 56 issued an alert, information about a time of issuance of the alert, and information indicating a type of the alert.

The microprocessor communication unit 53 used in the information processing system 1 of the present preferred embodiment has a lower communication capability than the mobile communication unit 43, so that the microprocessor communication unit 53 is simply to transmit alert history information to the server 2 mainly. However, the microprocessor communication unit 53 is not limited to this configuration. Specifically, like the mobile communication unit 43, the microprocessor communication unit 53 may transmit traveling path information indicating a traveling path of the ship 6 to the server 2.

The microprocessor notification unit 56 issues an alert by outputting an alert sound under the control of the microprocessor notification controller 523.

The microprocessor speed detector 57 detects the speed of the ship 6. The microprocessor speed detector 57 detects the speed of the ship 6 by acquiring the number of rotations of the engine from the ECU 61. If information about a speed is received from the ECU 61, the microprocessor speed detector 57 is not required to detect a speed again. The microprocessor speed detector 57 may detect the speed of the ship 6 by a different method such as making a calculation based on present location information, for example.

The microprocessor present location detector 58 detects the present location of the ship 6. For example, the microprocessor present location detector 58 acquires present location information by receiving a radio wave from a GPS satellite using a GPS sensor. Instead of including the microprocessor present location detector 58, the microprocessor 5 may acquire information about a present location from the mobile terminal 4 through communication via the microprocessor communication unit 53. The microprocessor present location detector 58 may detect the present location by a different method.

The microprocessor main memory 59 may be a storage device that stores various types of data temporarily when the microprocessor 5 is working. The microprocessor main memory 59 may be a RAM. The microprocessor main memory 59 stores particular tile information received by the microprocessor tile information acquisition unit 524 from the recording medium 51.

Figure 6:
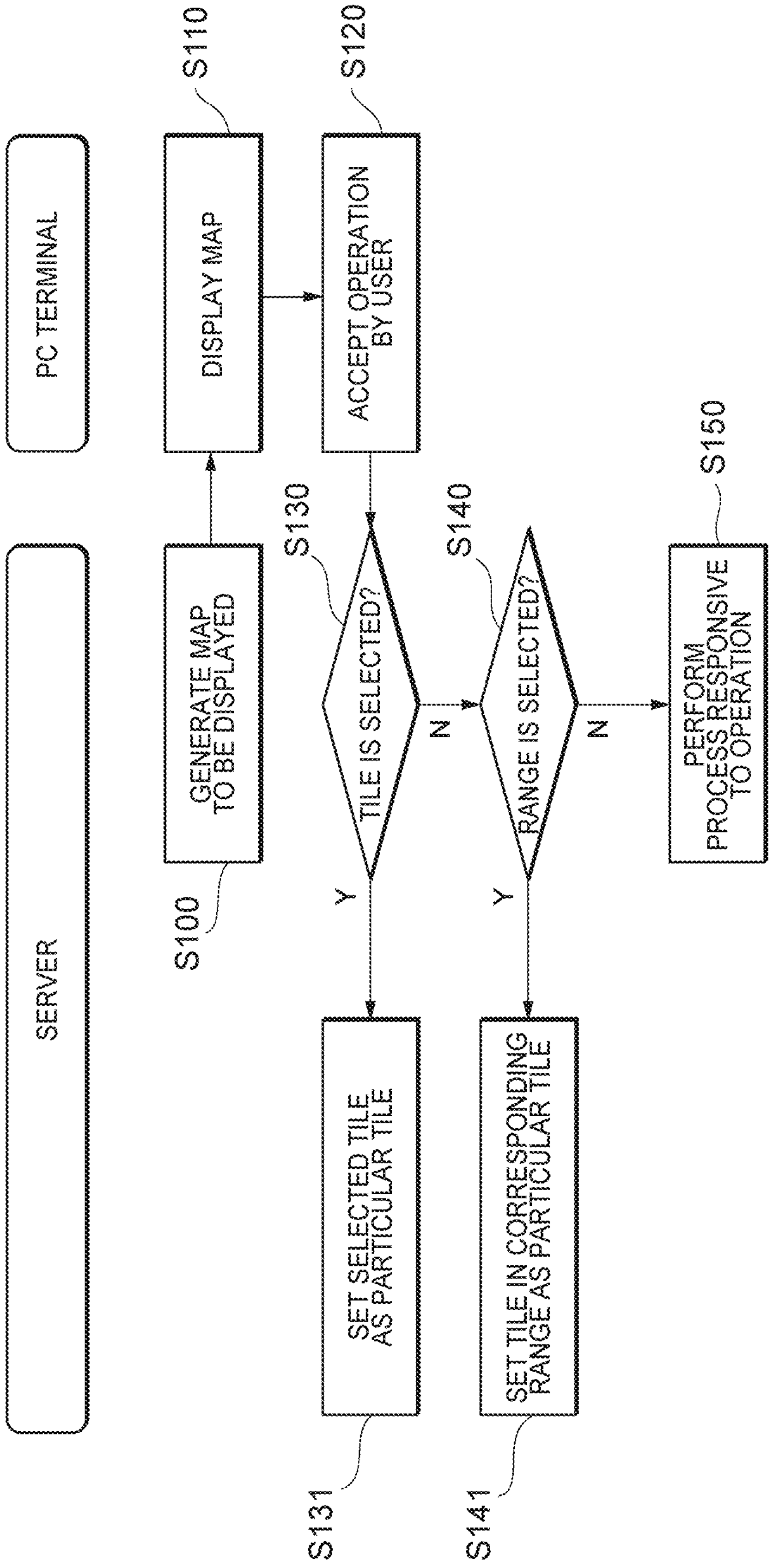
FIG. 6 is a flowchart showing a procedure of a particular tile setting process.

A particular tile setting process shown in the flowchart in FIG. 6 is performed by the server 2 and the PC terminal 3. The particular tile setting process is a process of setting particular tile information to identify a tile corresponding to a particular area in the server storage unit 21 of the server 2. The symbol "S" shown in the flow chart indicates "step".

First, in S100, the display generation unit 221 of the server 2 generates an image including a water-based map to be displayed on the PC display unit 34 of the PC terminal 3. Next, in S110, the PC display controller 321 displays the image on the PC display unit 34 including the water-based map and having been received from the server 2.

Figure 7:
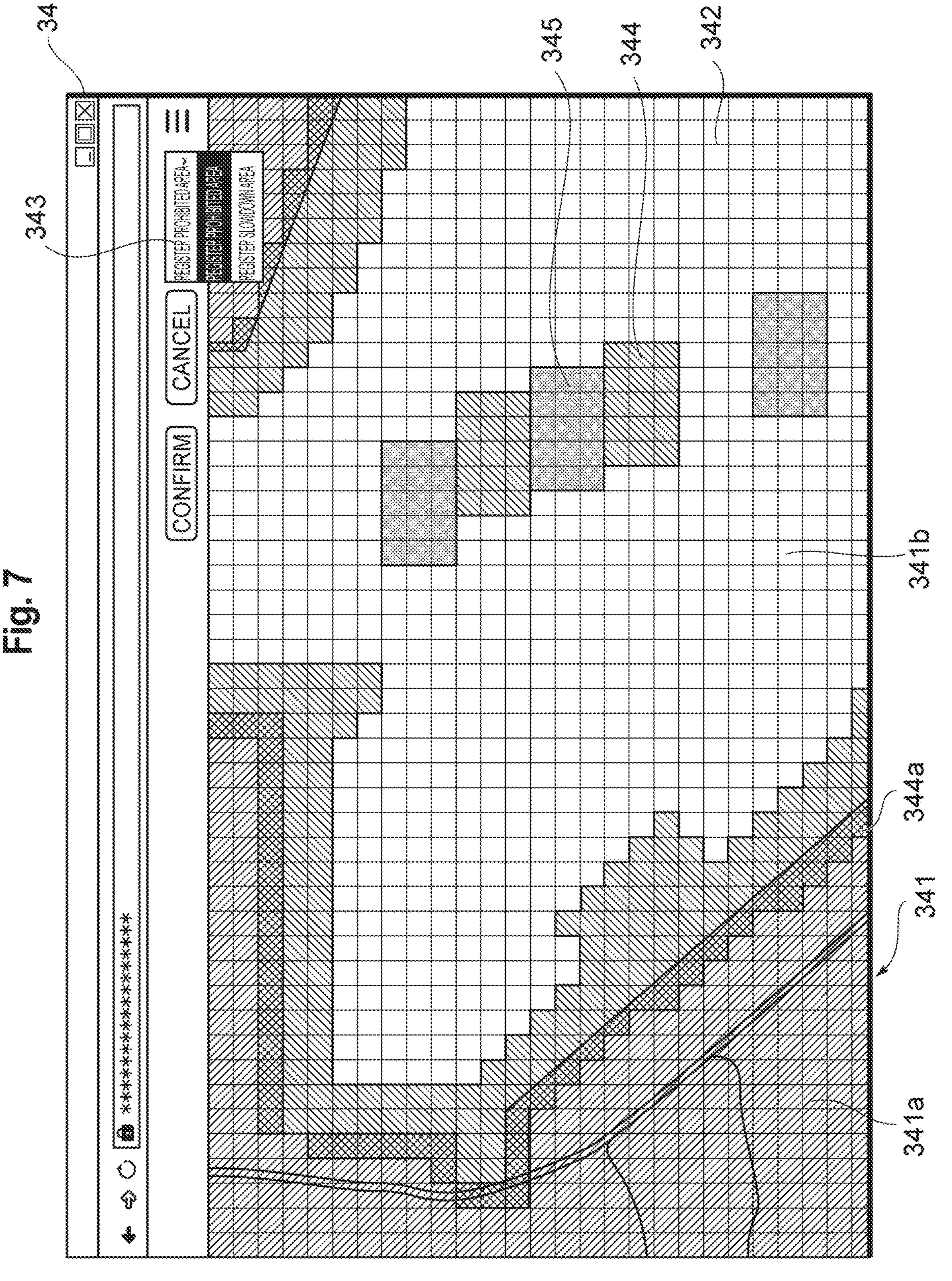
FIGS. 7, 8A, 8B, and 9A to 9C are explanatory views explaining the particular tile setting process.

FIG. 7 shows the image displayed on the PC display unit 34 during implementation of the particular tile setting process. As shown in FIG. 7, the PC display unit 34 displays a map 341, meshes 342 displayed in a mesh pattern on the map 341, and a menu indication 343 to switch between a mode of setting the prohibited area and a mode of setting the slowdown area. The meshes 342 are lines of a net pattern dividing the map 341. On the map 341, a land area is represented as hatched tiles 341*a* and a water area is represented as tiles 341*b* without hatching. On the map 341, tiles 344 corresponding to an area set as the slowdown area and tiles 345 corresponding to an area set as the prohibited area are superimposed on the image of the map. More specifically, two types of hatching are superimposed on displayed tiles 344*a* that are a land area and correspond to an area set as the slowdown area. Specifically, the water area is displayed in a configuration in which tiles corresponding to an area set as the slowdown area are displayed as the tiles 344, tiles corresponding to an area set as the prohibited area are displayed as the tiles 345, and tiles corresponding to an area that is neither the slowdown area nor the prohibited area are displayed as the tiles 341*b*. Meanwhile, the land area is displayed in a configuration in which tiles corresponding to an area set as the slowdown area are displayed as the tiles 344*a* and tiles corresponding to an area that is neither the slowdown area nor the prohibited area are displayed as the tiles 341*a*. While not shown in FIG. 7, a tile that is in the land area and corresponds to an area set as the prohibited area is shown in a format in which the display formats of the tile 341*a* and the tile 345 are superimposed on each other. The tiles 341*a*, 341*b*, 344, 344*a*, and 345 are actually displayed in colors or formats differing from each other on the PC display unit 34. When an administrator operates the menu indication 343, a target to be set as a particular tile in the server 2 is switched between the prohibited area and the slowdown area.

Next, in S120, the PC accepting unit 322 accepts an operation performed by the administrator using the PC input unit 35, and transmits information about the operation by the administrator to the server 2 via the PC communication unit 33.

Next, if the operation by the administrator is determined to be an operation to select a tile in S130, the tile setting unit 222 stores the tile selected by the administrator in the server storage unit 21 as a particular tile corresponding to the prohibited area or the slowdown area in S131.

Figure 8A:
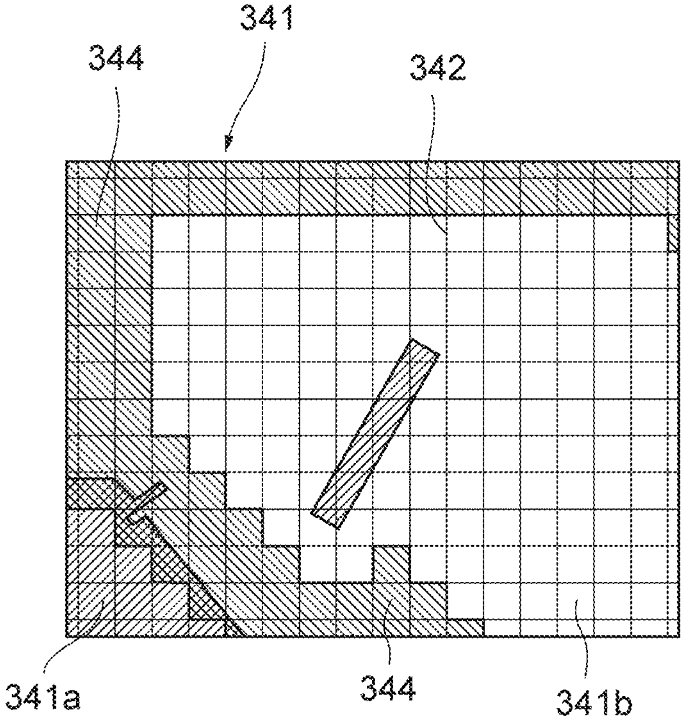
Figure 8B:
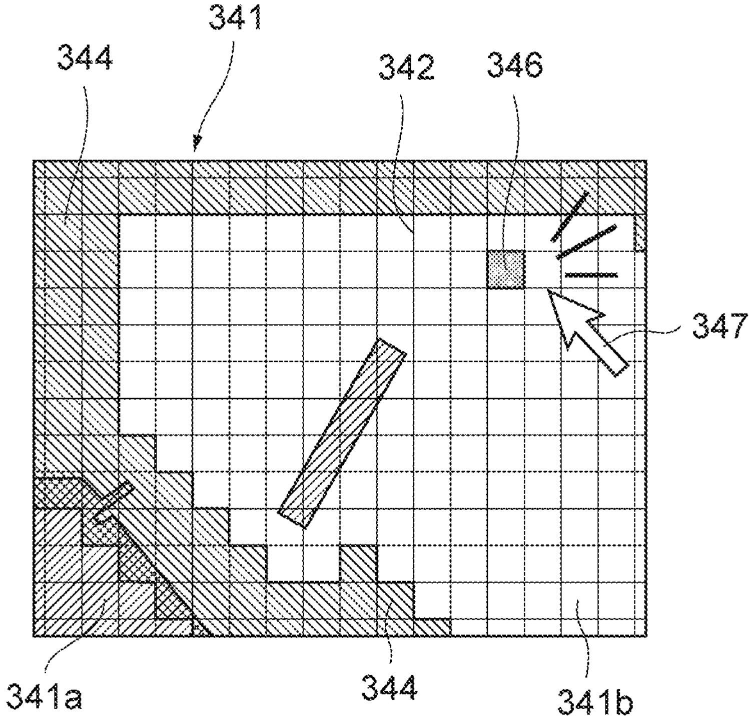

The map 341 such as that shown in FIG. 8A is displayed together with the meshes 342 on the PC display unit 34. For example, when the administrator operates a mouse as the PC input unit 35, a mouse pointer 347 moves in response to the operation by the administrator. When the administrator clicks the mouse, a target tile 346 is selected. As shown in FIG. 8B, the tile 346 set as a particular tile corresponding to the prohibited area or the slowdown area is displayed on the PC display unit 34 as a tile corresponding to the prohibited area or the slowdown area.

Meanwhile, if the operation performed by the administrator is determined to be a process to surround an area on the map 341 displayed on the PC display unit 34 in S140, the tile setting unit 222 stores adjacent tiles in the area on the PC display unit 34 surrounded by the administrator in the server storage unit 21 as particular tiles corresponding to the prohibited area or the slowdown area in S141.

Figure 9A:
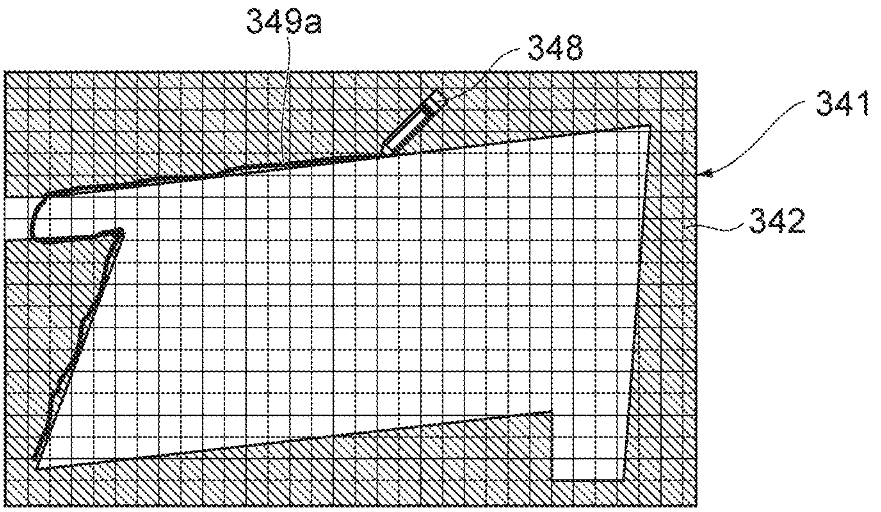
Figure 9B:
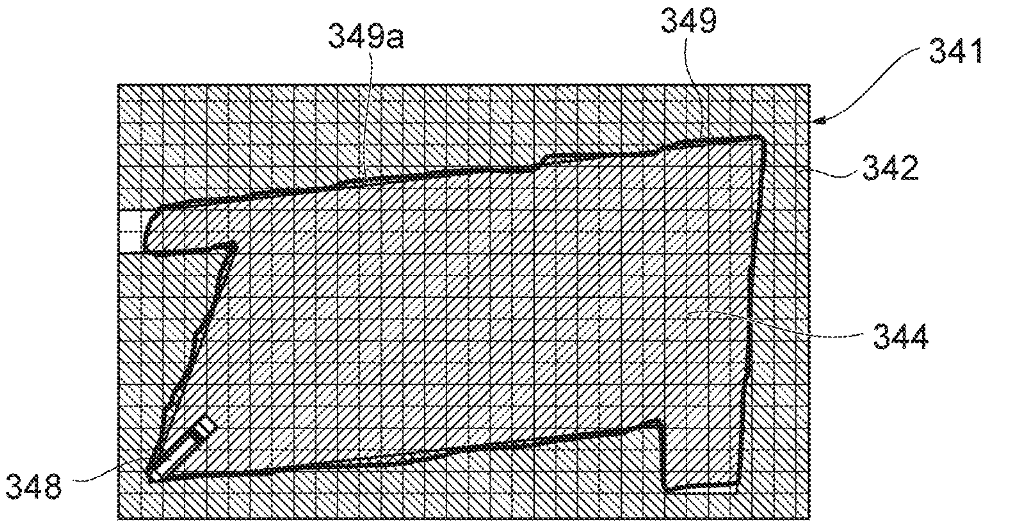
Figure 9C:
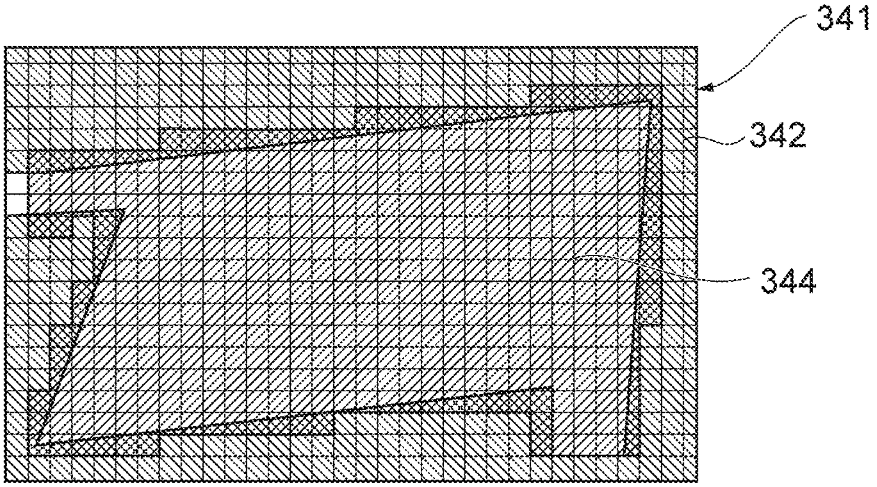

The map 341 such as that shown in FIG. 9A is displayed together with the meshes 342 on the PC display unit 34. For example, when the administrator operates the mouse as the PC input unit 35 and starts an operation of surrounding a range on the map 341 on the PC display unit 34, a mouse pointer icon is changed to a pen icon 348. As shown in FIG. 9B, when the administrator performs an operation of tracing an outline of an intended range 349 on the map 341 displayed on the PC display unit 34 and surrounding the range 349, a path 439*a* of the tracing appears. As shown in FIG. 9C, after the operation of tracing the outline and surrounding the intended range 349 is finished, two or more tiles corresponding to an area on the PC display unit 34 surrounded by the path 349*a* are selected. By doing so, the administrator can set a plurality of tiles collectively as a particular area efficiently through selection of the range without the need of selecting tiles one by one to set a particular area.

Meanwhile, if the administrator performs an operation other than those described above, the server controller 22 of the server 2 or the PC controller 32 of the PC terminal 3 performs a process in S150 responsive to the operation by the administrator.

According to the present preferred embodiment, tiles are defined by dividing an area on a map into a mesh pattern. The tile is designated using a zoom level and a tile coordinate. In particular, an optimum zoom level is used for the purpose of reducing the amount of information processing by the microprocessor 5 in the information processing system 1 and reducing the volume of data stored in the microprocessor main memory 59.

Figure 10:
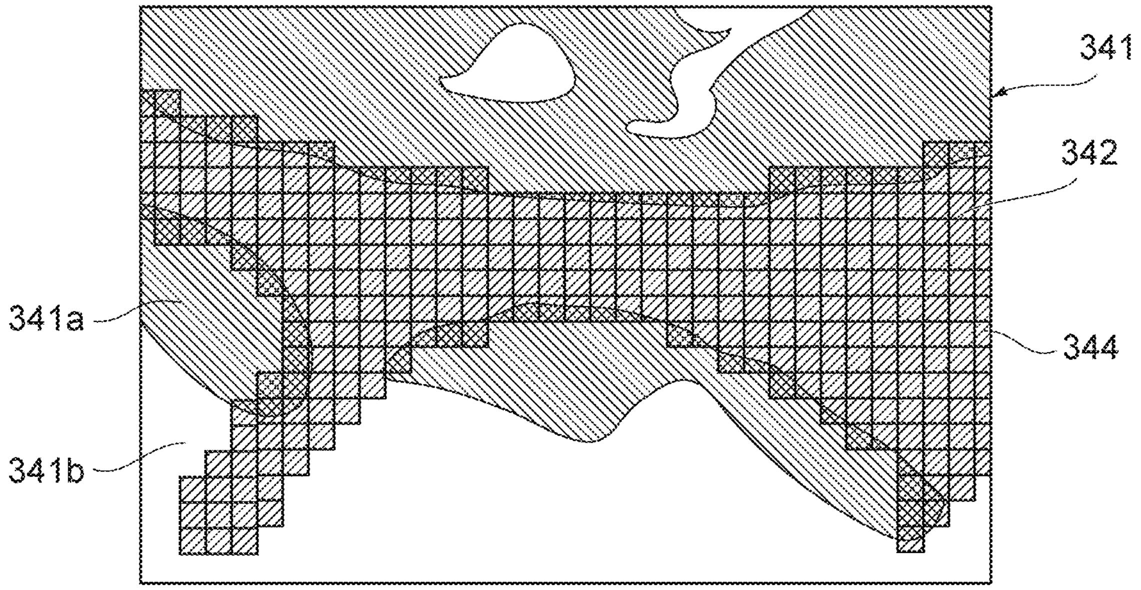
FIGS. 10 to 13 are explanatory views explaining a mesh width.
Figure 11:
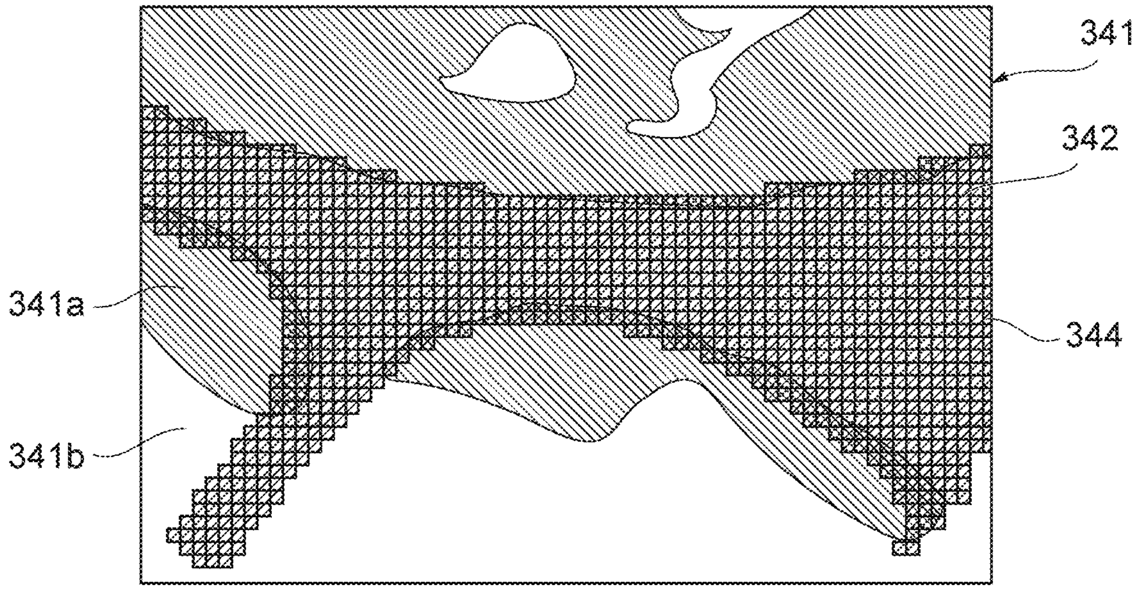

FIGS. 10 and 11 each show the map 341, the meshes 342, and other information displayed on the PC display unit 34 of the PC terminal 3. FIG. 10 shows a display on the PC display unit 34 at a zoom level 20. FIG. 11 shows a display on the PC display unit 34 at a zoom level 21. A mesh width is, for example, about 31.1 m at the zoom level 20. The mesh width refers to an interval between adjacent ones of meshes defining tiles that corresponds to a distance in an actual water area. In other words, the mesh width refers to a distance along one side of an actual area corresponding to a tile. At the zoom level 21, the mesh width is, for example, about 15.0 m. Experimental results obtained by the inventor of preferred embodiments of the present invention shows that, in consideration of the accuracy of an alert issued in response to entry into the prohibited area of the slowdown area, an error occurring during acquisition of present location information using a GPS, and the load of information processing on the microprocessor 5, the zoom level 20 is more suitable than the zoom level 21. More specifically, while sufficient accuracy of an alert could be achieved by using either the zoom level 21 or 20, using the zoom level 21 caused an increased load of information processing on the microprocessor 5.

Figure 12:
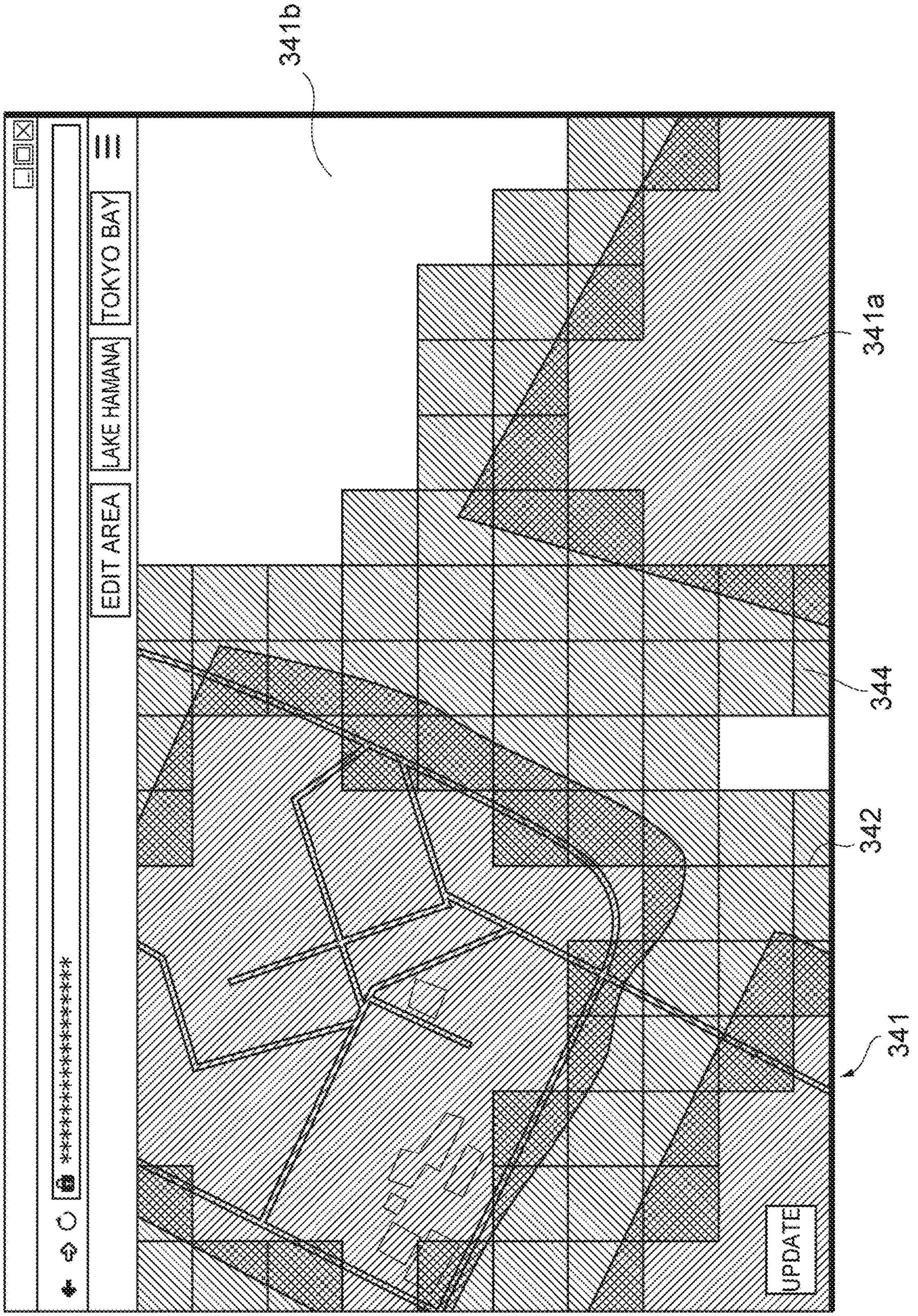
Figure 13:
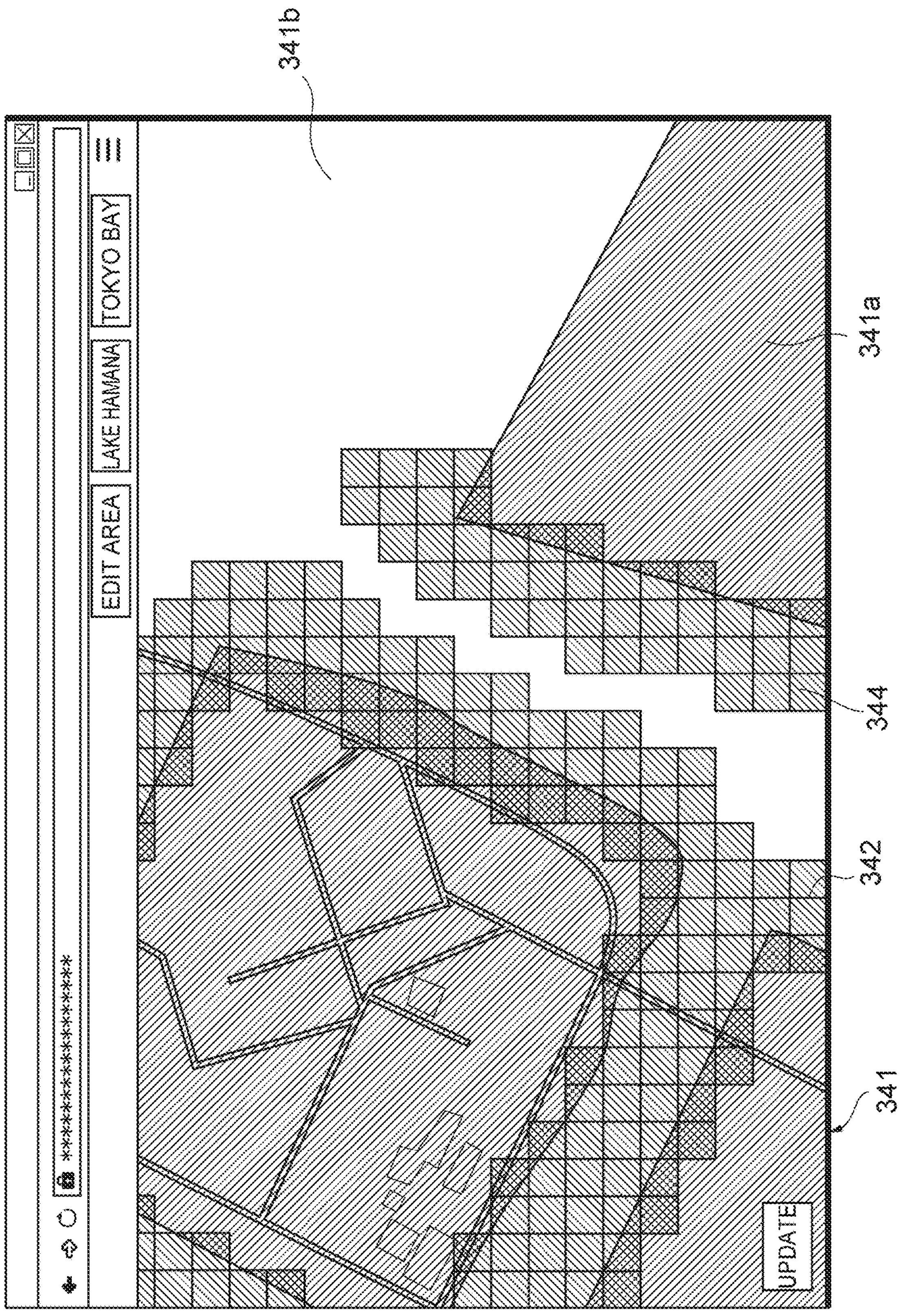

FIGS. 12 and 13 each show the map 341, the meshes 342, and other information displayed on the PC display unit 34 of the PC terminal 3. FIG. 12 shows a display on the PC display unit 34 at a zoom level 19. FIG. 13 shows a display on the PC display unit 34 at the zoom level 20. The mesh width is, for example, about 62.2 m at the zoom level 19. As shown in FIG. 13, a displayed water area includes an area not corresponding to the slowdown area. Meanwhile, this area not corresponding to the slowdown area is unrecognizable according to the display at the zoom level 19 shown in FIG. 12. Experimental results obtained by the inventors shows that the zoom level 20 is more suitable than the zoom level 19 in order to make the prohibited area or the slowdown area properly recognizable.

In the information processing system 1 of the present preferred embodiment, it is preferable to use the zoom level 20 in order to obtain an optimum mesh width. Such a mesh width is, for example, about 31.1 m. In the information processing system 1 of the present preferred embodiment, the mesh width is preferably equal to or greater than about 20 m and equal to or less than about 40 m. More preferably, the mesh width is equal to or greater than about 26 m and equal to or less than about 36 m. Still more preferably, the mesh width is equal to or greater than about 28 m and equal to or less than about 34 m. Further preferably, the mesh width is equal to or greater than about 29.5 m and equal to or less than about 32.7 m. Setting the mesh width in this way makes it possible to issue an alert with an accuracy sufficient for practical purpose in response to entry into the prohibited area or the slowdown area while restricting the load of information processing on the microprocessor 5 properly. Even at the same zoom level, a mesh width changes in response to a latitude. Thus, in the information processing system 1, it is preferable to use a zoom level at which the above-described mesh width is obtained.

Figure 14:
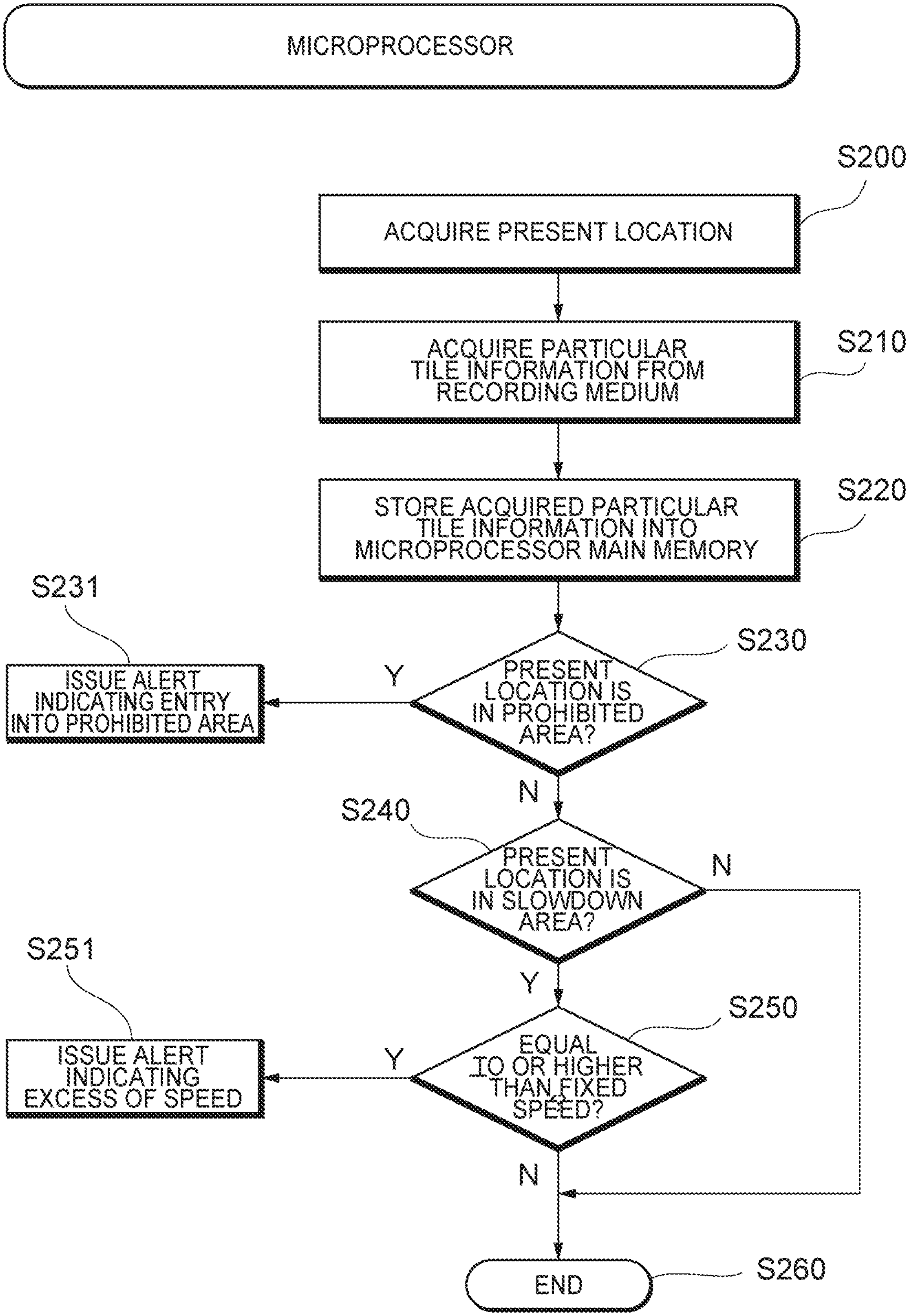
FIG. 14 is a flowchart showing a procedure of an alert process by the microprocessor.

In an alert process by the microprocessor 5 shown in FIG. 14, the microprocessor present location detector 58 first detects the present location of the ship 6 in S200.

Next, in S210, the microprocessor tile information acquisition unit 524 determines a range of acquisition of particular tile information in response to the present location detected by the microprocessor present location detector 58, and acquires particular tile information from the recording medium 51.

Next, in S220, the microprocessor tile information acquisition unit 524 stores the acquired particular tile information in the microprocessor main memory 59.

Next, in S230, the microprocessor notification controller 523 compares information about the present location of the ship 6 and the particular tile information with each other. If the present location is in the prohibited area, the microprocessor notification controller 523 issues an alert indicating entry of the ship 6 into the prohibited area via the microprocessor notification unit 56 in S231.

Meanwhile, if the present location is in the slowdown area in S240 and if the ship 6 travels at a speed equal to or higher than a fixed speed in S250, the microprocessor notification controller 523 issues an alert indicating that the ship 6 exceeds the speed in the slowdown area via the microprocessor notification unit 56 in S251.

The microprocessor 5 may be configured or programmed to suspend issuance of an alert for a fixed period of time after the microprocessor 5 issues an alert once. This makes it possible to reduce the occurrence of a situation where an alert is issued continuously while the ship 6 is required to travel in the prohibited area, for example. An interval from when an alert is issued once to when a next alert is issued is preferably about 5 minutes, for example. This interval is more preferably about 1 minute, for example.

The acquisition of particular tile information and the storage of the particular tile information in the microprocessor main memory 59 in S210 and S220 are preferably performed in conformity with a predetermined timing such as those described above, and not at each acquisition of a present location.

Figure 15:
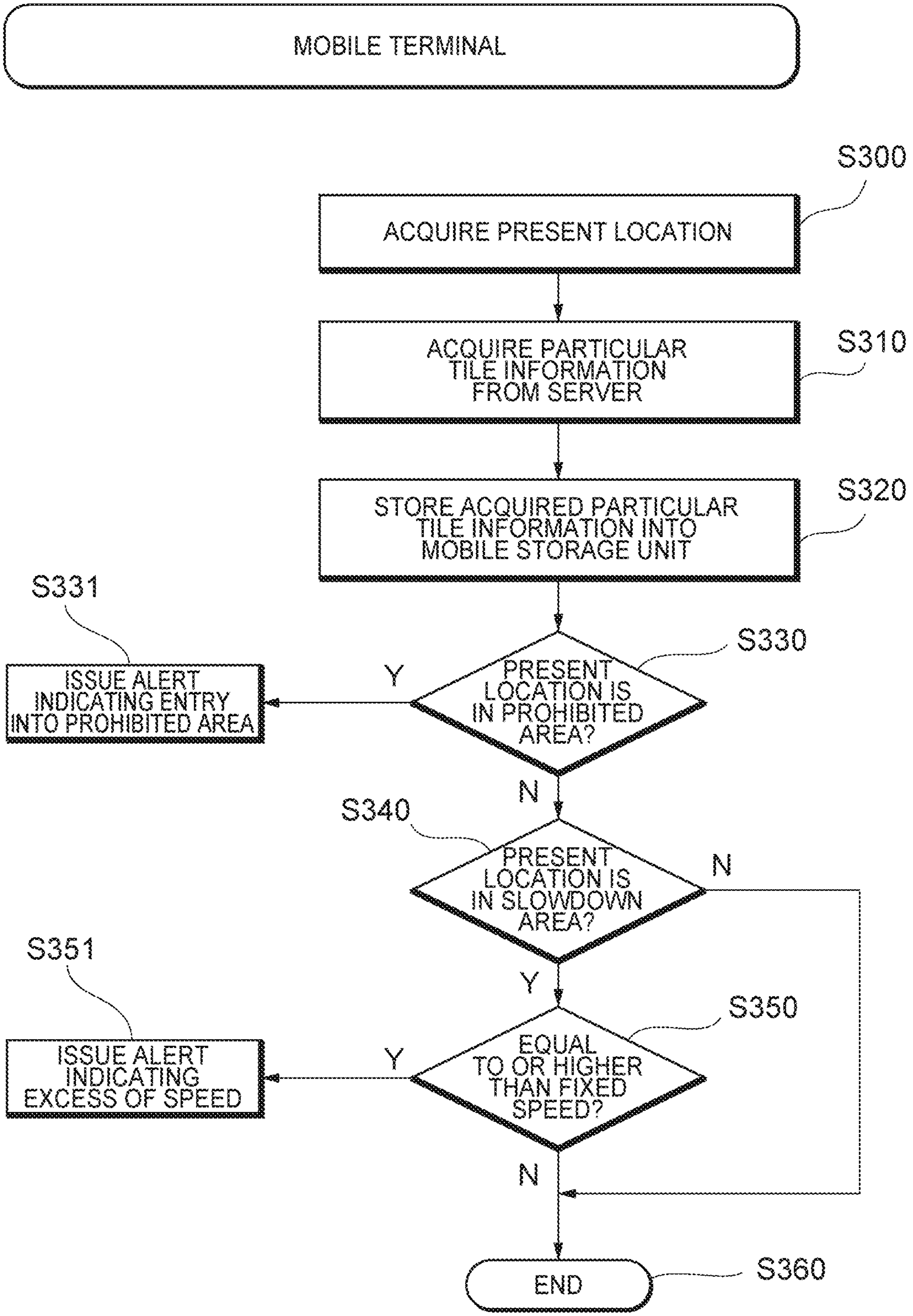
FIG. 15 is a flowchart showing a procedure of an alert process by the mobile terminal.

In an alert process by the mobile terminal 4 shown in FIG. 15, the mobile present location detector 48 first detects the present location of the ship 6 in S300.

Next, in S310, the mobile tile information acquisition unit 424 determines a range of acquisition of particular tile information in response to the present location detected by the mobile present location detector 48, and acquires particular tile information from the server storage unit 21 of the server 2 via the mobile communication unit 43.

Next, in S320, the mobile tile information acquisition unit 424 stores the particular tile information in the mobile storage unit 41.

Next, in S330, the mobile notification controller 423 compares information about the present location of the ship 6 and the particular tile information with each other. If the present location is in the prohibited area, the mobile notification controller 423 issues an alert indicating entry of the ship 6 into the prohibited area via the mobile notification unit 46 in S331.

Meanwhile, if the present location is in the slowdown area in S340 and if the ship 6 travels at a speed equal to or higher than a fixed speed in S350, the mobile notification controller 423 issues an alert indicating that the ship 6 exceeds the speed in the slowdown area via the mobile notification unit 46 in S351.

The acquisition of particular tile information and the storage of the particular tile information in the mobile storage unit 41 in S310 and S320 are preferably performed in conformity with a predetermined timing such as those described above, and not at each acquisition of a present location.

Figure 16:
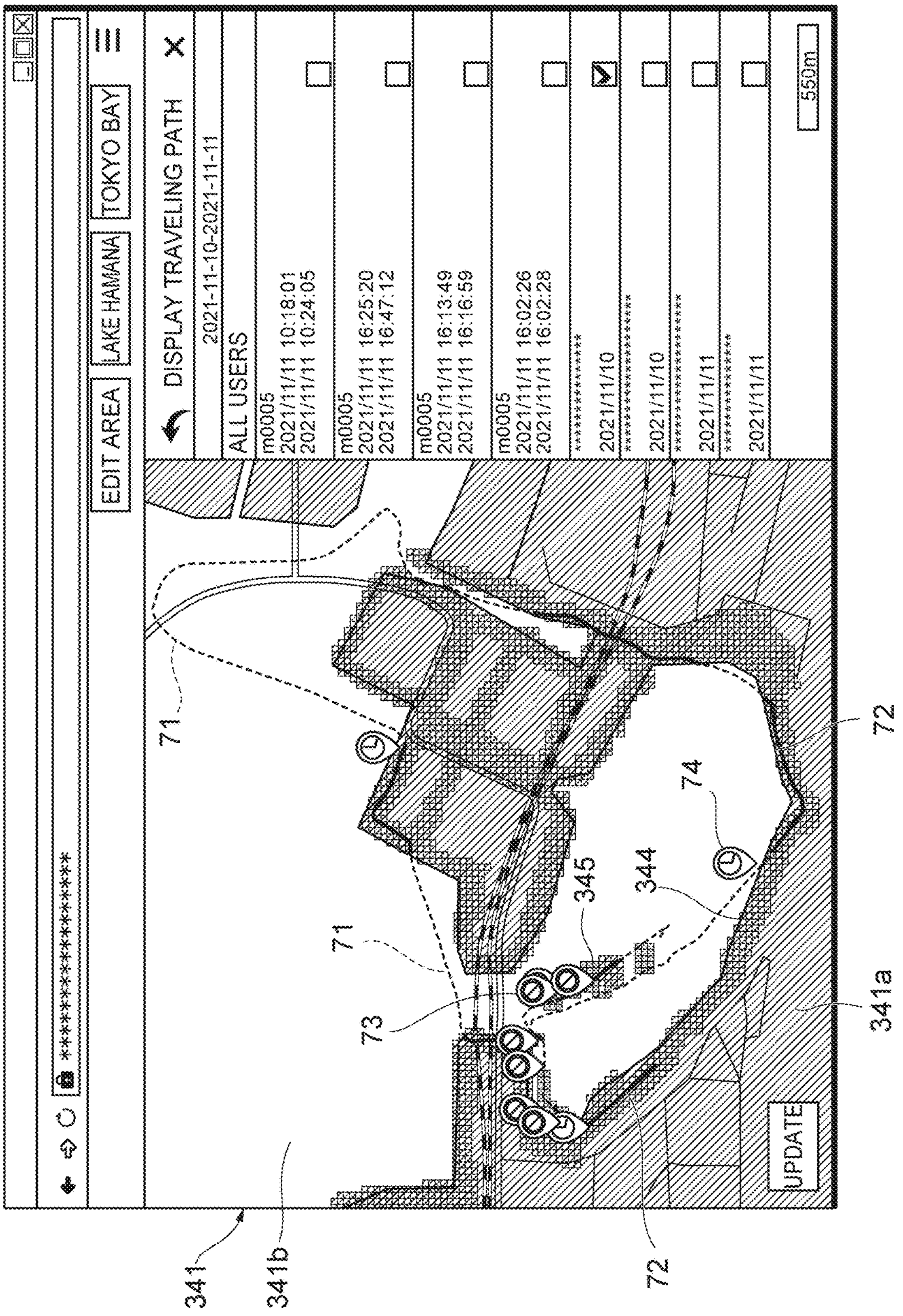
FIG. 16 is an explanatory view explaining a process of displaying a traveling path and an alert history.

As shown in FIG. 16, in the information processing system 1, a traveling path and an alert history of the ship 6 can be displayed on the PC display unit 34 of the PC terminal 3. The traveling path and the alert history of the ship 6 may be displayed on the mobile terminal 4, and not on the PC terminal 3.

When an administrator operates the PC input unit 35 of the PC terminal 3 to display the traveling path of the ship 6, the traveling path acquisition unit 225 of the server 2 acquires traveling path information from the server storage unit 21. Furthermore, the alert history acquisition unit 227 acquires alert history information from the server storage unit 21. The display generation unit 221 generates an image to be displayed on the PC display unit 34 of the PC terminal 3 based on the acquired traveling path information and alert history, and map data and particular tile information stored in the server storage unit 21. The PC terminal 3 acquires the image generated by the display generation unit 221. Then, under the control of the PC display controller 321, the image such as that shown in FIG. 16 is displayed on the PC display unit 34.

As shown in FIG. 16, the traveling history is indicated by a line 71 and a line 72 on the map, and the alert history is indicated by an icon 73 and an icon 74 on the map. In FIG. 16, for the purpose of convenience, a history of traveling in the normal area is indicated by the dotted line 71 and a history of traveling in the prohibited area or the slowdown area is indicated by the solid line 72. A way in which these lines 71 and 72 are shown is determined freely. For example, these lines 71 and 72 may be displayed in different colors. Regarding the alert history shown in FIG. 16, a position where an alert responsive to entry into the prohibited area was issued is indicated by the icon 73 and a position where an alert responsive to traveling at an excessive speed in the slowdown area was issued is indicated by the icon 74. As shown in FIG. 16, a ship or date and time targeted for display of a traveling history and an alert history on the PC display unit 34 is selectable by an administrator.

Second Preferred Embodiment

Figure 17:
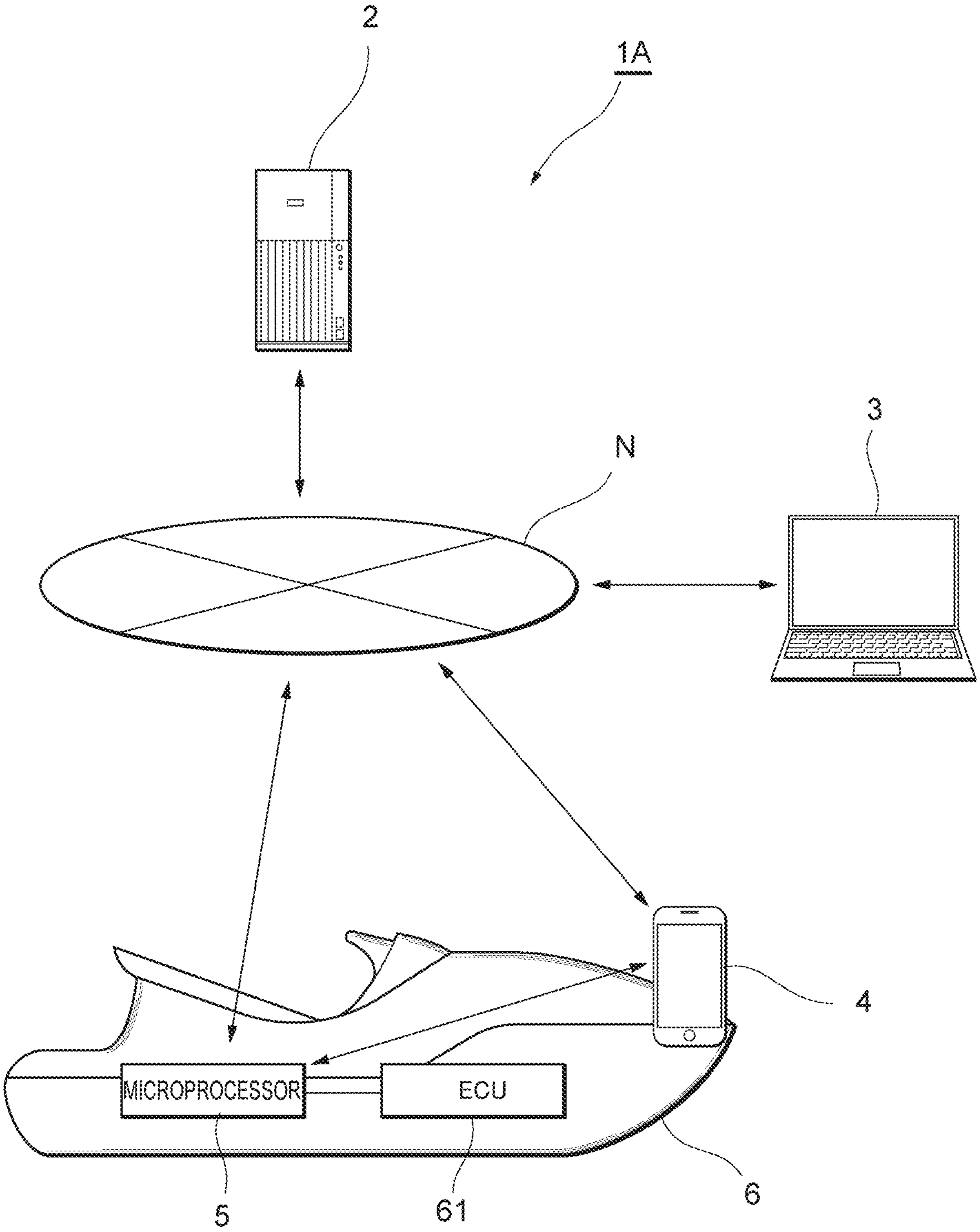
FIG. 17 shows a configuration of an information processing system according to a second preferred embodiment of the present invention.

As shown in FIG. 17, in an information processing system 1A according to a second preferred embodiment of the present invention, the mobile terminal 4 and the microprocessor 5 are connected to each other in a wired or wireless manner and are communicable with each other. In the information processing system 1A, the mobile terminal 4 and the microprocessor 5 work in cooperation with each other to perform an alert process. As described below in detail, in the information processing system 1A, the mobile terminal 4 determines to issue an alert and the microprocessor 5 actually issues the alert.

Figure 18:
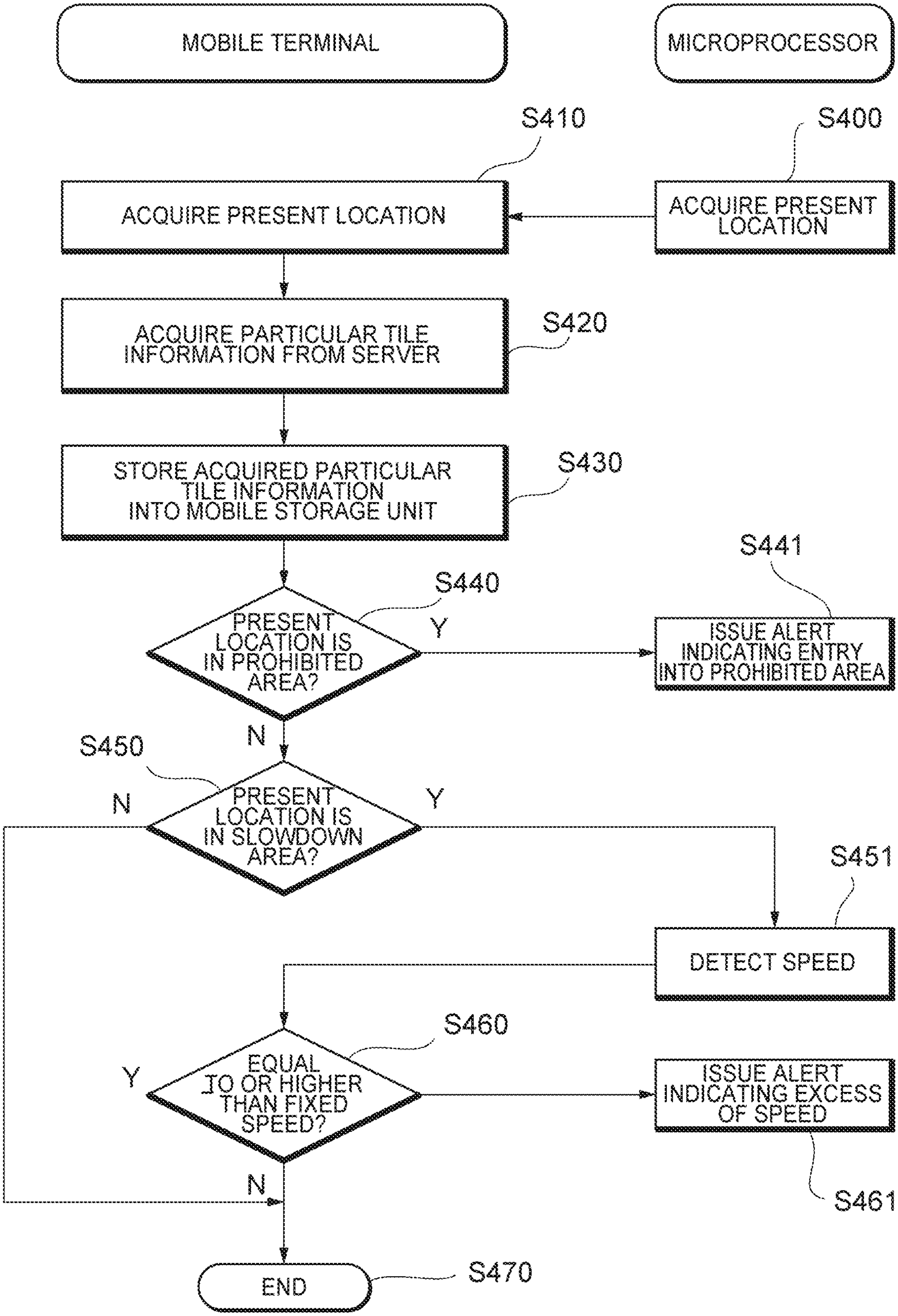
FIG. 18 is a flowchart showing a procedure of an alert process using the mobile terminal and the microprocessor.

In the alert system shown in FIG. 18 using the mobile terminal 4 and the microprocessor 5, the microprocessor present location detector 58 first detects a present location in S400. Next, in S410, the mobile present location detector 48 of the mobile terminal 4 acquires the present location. Here, the mobile terminal 4 corrects information about a present location based on information about the present location detected by the microprocessor present location detector 58. However, the present location is not always required to be corrected. In this case, a present location may be acquired by either the microprocessor present location detector 58 or the mobile present location detector 48.

Next, in S420, the mobile tile information acquisition unit 424 determines a range of acquisition of particular tile information in response to the detected present location, and acquires particular tile information from the server storage unit 21 of the server 2 via the mobile communication unit 43.

Next, in S430, the mobile tile information acquisition unit 424 stores the particular tile information acquired from the server 2 in the mobile storage unit 41.

Next, in S440, the mobile notification controller 423 compares information about the present location of the ship 6 and the particular tile information with each other. If the present location is in the prohibited area, the mobile notification controller 423 issues an alert indicating entry of the ship 6 into the prohibited area via the microprocessor notification unit 56 in S441.

Meanwhile, if the present location is in the slowdown area in S450, the microprocessor speed detector 57 detects the speed of the ship 6 in S451. Next, if the ship 6 travels at a speed equal to or higher than a fixed speed in S460, the mobile notification controller 423 issues an alert indicating that the ship 6 exceeds the speed in the slowdown area via the microprocessor notification unit 56 in S461.

While the mobile terminal 4 has excellent information processing capability, the mobile notification unit 46 is incapable of outputting sound at full volume. On the other hand, while the microprocessor 5 is inferior to the mobile terminal 4 in terms of information processing capability, a speaker capable of outputting sound at full volume can be used as the microprocessor notification unit 56. Thus, by causing the mobile terminal 4 to perform information processing to issue an alert and causing the microprocessor 5 to output sound to issue the alert as described above, it becomes possible to issue the alert in a preferable configuration while taking advantage of the mobile terminal 4 and the microprocessor 5.

The acquisition of particular tile information and the storage of the particular tile information in the mobile storage unit 41 in S420 and S430 are preferably performed in conformity with predetermined timing such as those described above, and not at each acquisition of a present location.

As described above, the information processing system 1 sets a particular area that is a water area requiring the ship 6 to take caution. The information processing system 1 includes the PC display unit 34, the PC input unit 35, the server storage unit 21, the mobile present location detector 48 or the microprocessor present location detector 58 as a present location detector, and the mobile controller 42 or the microprocessor controller 52 as a controller. The PC display unit 34 displays the map 341 and the meshes 342 dividing the map 341. The PC input unit 35 is operated by an administrator of the particular area. The server storage unit 21 stores particular tile information. The particular tile information indicates a tile selected by the administrator via the PC input unit 35 from two or more tiles defining a portion of the map 341 divided by the meshes 342. The mobile present location detector 48 or the microprocessor present location detector 58 acquires present location data indicating the present location of the ship 6 at a predetermined time interval. The mobile controller 42 or the microprocessor controller 52 determines to issue an alert responsive to entry of the ship 6 into the particular area based on the present location data and the particular tile information.

In the above-described preferred embodiments, the PC display unit 34 displays the meshes 342 at an interval corresponding to a length of equal to or greater than about 20 m and equal to or less than about 40 m in a water area.

The information processing system 1 further includes the PC controller 32. The PC controller 32 may set two or more tiles as particular tiles that are in the selection range 349 surrounded by the path 439*a* of tracing on the PC display unit 34 by the administrator. The PC controller 32 may or may not incorporate tiles traced by the administrator to set the selection range 349. In the present preferred embodiment, as shown in FIG. 9C, the PC controller 32 incorporates tiles through which the mouse pointer 347 passed in response to operation by the administrator into the selection range 349 as tiles traced by the administrator. Specifically, the tiles traced by the administrator are at outermost positions in the selection range 349.

In the first preferred embodiment, the server 2 further includes the server communication unit 23 that communicates with the mobile terminal 4 or the microprocessor 5 as an information processing device. The server 2 can transmit particular tile information corresponding to the present location of the ship 6 and the periphery of the present location and belonging to particular tile information stored in the server storage unit 21 to the mobile terminal 4 or the microprocessor 5 via the server communication unit 23.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An information processing method comprising:

displaying a water-based map on a display unit;

accepting selection of a tile from among a plurality of tiles that divide an area on the water-based map into a mesh pattern;

storing the selected tile in a storage unit as a particular tile;

detecting a present location of a ship at a predetermined time interval; and notifying an alert when the ship enters a water area corresponding to the particular tile; and acquiring particular tile information as information about the particular tile within a predetermined range around the detected present location of the ship.

2. The information processing method according to claim 1, wherein the particular tile is in a designated area on the water-based map.

3. The information processing method according to claim 1, wherein adjacent meshes of the mesh pattern corresponding to the plurality of tiles are spaced apart from each other at a distance equal to or greater than about 20 m and equal to or less than about 40 m in the water area.

4. The information processing method according to claim 1, wherein the water area corresponding to the particular tile includes a prohibited area where entry of the ship is prohibited, and a slowdown area where the ship is required to travel at a speed equal to or lower than a predetermined speed.

5. The information processing method according to claim 1, further comprising:

stepwise changing a mesh width corresponding to an area of the particular tile; and storing the particular tile of a predetermined mesh width in the storage unit.

6. An information processing system comprising:

a server to manage a tile identifying a water area requiring caution during traveling of a ship as a particular tile from among a plurality of tiles corresponding to a plurality of areas resulting from division of an area on a map into a mesh pattern; and an information processor to be mounted on the ship; wherein the server is configured or programmed to function as:

a first storage unit;

a display generation unit to generate the map based on water to be displayed on a display unit; and a tile setting unit to store the particular tile in the first storage unit, the particular tile being selected by an administrator; and the information processor is configured or programmed to function as:

a present location detector to detect a present location of a ship at a predetermined time interval; and a tile information acquisition unit to acquire particular tile information as information about the particular tile within a predetermined range around the detected present location of the ship;

a second storage unit to store the acquired particular tile information; and a notification unit to notify an alert when the ship enters a water area corresponding to the particular tile.

7. The information processing system according to claim 6, wherein the information processor includes a recording medium to store the particular tile information acquired from the server and mountable on and removable from the information processor; and the tile information acquisition unit is operable to acquire the particular tile information from the recording medium and store the acquired particular tile information in the second storage unit.

* * * * *